United States Patent
Ogasawara

(10) Patent No.: US 7,428,193 B2
(45) Date of Patent: Sep. 23, 2008

(54) OPTICAL PICKUP DEVICE AND OPTICAL RECORDING MEDIUM REPRODUCING DEVICE

(75) Inventor: Masakazu Ogasawara, Saitama (JP)

(73) Assignee: Pioneer Corporation, Tokyo (JP)

( * ) Notice: Subject to any disclaimer, the term of this patent is extended or adjusted under 35 U.S.C. 154(b) by 472 days.

(21) Appl. No.: 10/960,926

(22) Filed: Oct. 12, 2004

(65) Prior Publication Data

US 2005/0083824 A1    Apr. 21, 2005

(30) Foreign Application Priority Data

Oct. 16, 2003    (JP)    ............... 2003-356961

(51) Int. Cl.
   *G11B 7/00*    (2006.01)

(52) U.S. Cl. ............... 369/44.23; 369/112.02; 369/53.2

(58) Field of Classification Search ............... 369/44.23, 369/112.02
   See application file for complete search history.

(56) References Cited

U.S. PATENT DOCUMENTS 5,936,923 A * 8/1999 Ootaki et al. ............ 369/53.19
6,130,872 A * 10/2000 Sugiura et al. ......... 369/112.04
6,141,304 A    10/2000 Ogasawara
6,151,154 A    11/2000 Ogasawara
6,678,232 B2 * 1/2004 Ogasawara et al. .... 369/112.02
6,778,472 B2 * 8/2004 Nishikawa ............... 369/44.21
7,054,253 B1 * 5/2006 Nomura et al. ........ 369/112.02
7,164,638 B2 * 1/2007 Wada et al. .............. 369/53.19
2002/0191502 A1   12/2002 Hirai

FOREIGN PATENT DOCUMENTS

| JP | 9-128785 A | 5/1997 |
|---|---|---|
| JP | 11-110802 A | 4/1999 |
| WO | WO 03/049095 A2 | 6/2003 |

* cited by examiner

*Primary Examiner*—Joseph Feild
*Assistant Examiner*—Jorge L. Ortiz-Criado
(74) *Attorney, Agent, or Firm*—Foley & Lardner LLP

(57) ABSTRACT

A control mechanism includes a medium wavefront aberration correction voltage generating unit and an optical system wavefront aberration correction voltage generating unit therein, and has a mechanism that independently corrects a medium wavefront aberration caused by a shape or the like of an optical recording medium and an optical system wavefront aberration caused by an optical system in an optical pickup mechanism. Further, it includes a liquid crystal panel as an aberration correcting unit, and is designed to apply voltages corresponding to corrections of the medium wavefront aberration and the optical system wavefront aberration to two transparent electrodes provided in the liquid crystal panel.

15 Claims, 16 Drawing Sheets

OPTICAL PICKUP DEVICE AND OPTICAL RECORDING MEDIUM REPRODUCING DEVICE

BACKGROUND OF THE INVENTION

1) Field of the Invention

The present invention relates to an optical pickup device and an optical recording medium reproducing device.

2) Description of the Related Art

Conventionally, there is known an optical pickup device that reads information recorded in an optical recording medium such as a compact disc (CD) or a digital video disc (DVD) by a laser beam. The optical pickup device at least includes a light source that outputs a laser beam, an optical system that focuses laser beams output from the light source on a recording layer in the optical recording medium, and a light receiving unit that receives a return light from the recording layer. The optical pickup device uses the mechanism to irradiate a laser beam on the optical recording medium and to read information recorded in the recording layer based on an intensity of the return light acquired in the light receiving unit, or the like.

In the optical pickup device, a laser beam output from the light source is required to be focused on a spot having a predetermined diameter in the recording layer to avoid occurrence of reading error or the like as much as possible. Particularly, in recent years, a recording density is remarkably improved along with a larger capacity of the optical recording medium, thus a smaller spot diameter is required to be realized. Therefore, there has been proposed an optical pickup device that mounts a phase correcting unit for avoiding occurrence of a wavefront aberration which causes enlargement of a spot diameter as well as a design feature of the optical system.

The phase correcting unit is positioned between the light source and the optical recording medium, and is formed to include a liquid crystal panel, for example. A liquid crystal material contained in the liquid crystal panel has a structure where an index of refraction changes according to an applied voltage so that an appropriate applied voltage is selected to compensate for a phase difference in a laser beam that causes a wavefront aberration and to restrict occurrence of the wavefront aberration to a permissible degree (see Japanese Patent Application Laid-Open No. H9-128785).

However, since there are many factors that may cause the wavefront aberration, in the optical pickup device having a mechanism that uses a plurality of laser sources to read information recorded in a plurality of kinds of recording mediums, it is difficult to compensate for a phase difference in a laser beam and to restrict occurrence of the wavefront aberration only by applying an appropriate applied voltage to a liquid crystal panel. Particularly, in using Blue ray Disk (BD) and DVD, the wavefront aberration easily influences reading of these optical recording mediums.

SUMMARY OF THE INVENTION

It is an object of the present invention to solve at least the problems in the conventional technology.

An optical pickup device according to an aspect of the present invention includes a light source that outputs a light; an optical system through which the light is passed to thereby form a light spot on a surface of an optical recording medium; an optical system aberration correcting unit that corrects an optical system wavefront aberration that occurs while the light passes through the optical system so that the light that illuminates the surface is less in the optical system wavefront aberration; a medium aberration correcting unit that corrects a medium wavefront aberration that occurs due to an angle between the light that illuminates the surface and the surface so that the light that illuminates the surface is less in the medium wavefront aberration; and a light receiving unit that receives a light that is reflected the surface.

An optical recording medium reproducing device according to another aspect of the present invention performs light irradiating on an irradiated surface of an optical recording medium and reproduces information recorded in the optical recording medium based on a return light of the irradiated light. The optical recording medium reproducing device includes a plurality of light sources that output an irradiating light; an optical system that forms a spot on the irradiated surface based on the irradiating light output from the light sources; an optical system aberration correcting unit that corrects an optical system wavefront aberration that occurs while the irradiating light passes through the optical system; a medium aberration correcting unit that corrects a medium wavefront aberration that occurs based on an angle between the irradiated surface and the irradiating light in the irradiated surface; a light receiving unit that receives a return light whose wavefront aberration is corrected by the optical system aberration correcting unit and the medium aberration correcting unit; and a demodulating unit that demodulates information recorded in the optical recording medium based on a return light received in the light receiving unit.

The other objects, features, and advantages of the present invention are specifically set forth in or will become apparent from the following detailed description of the invention when read in conjunction with the accompanying drawings.

DETAILED DESCRIPTION

Exemplary embodiments of an optical pickup device and an optical recording medium reproducing device according to the present invention will be explained below in detail while referring to the accompanying drawings. It should be noted that the drawings are schematic and that a relationship between thickness and width in each portion, ratios of thicknesses in respective portions, and the like are different from actual ones, and it is natural that portions with mutually different dimensional relationships or ratios are included in the respective drawings. The following embodiments where a DVD and a BD are used as an optical recording medium will be explained, but an optical recording medium to be used may be any information recording medium from which recorded information can be optically read, such as a CD or AOD (Advanced Optical Disc).

Figure 1:
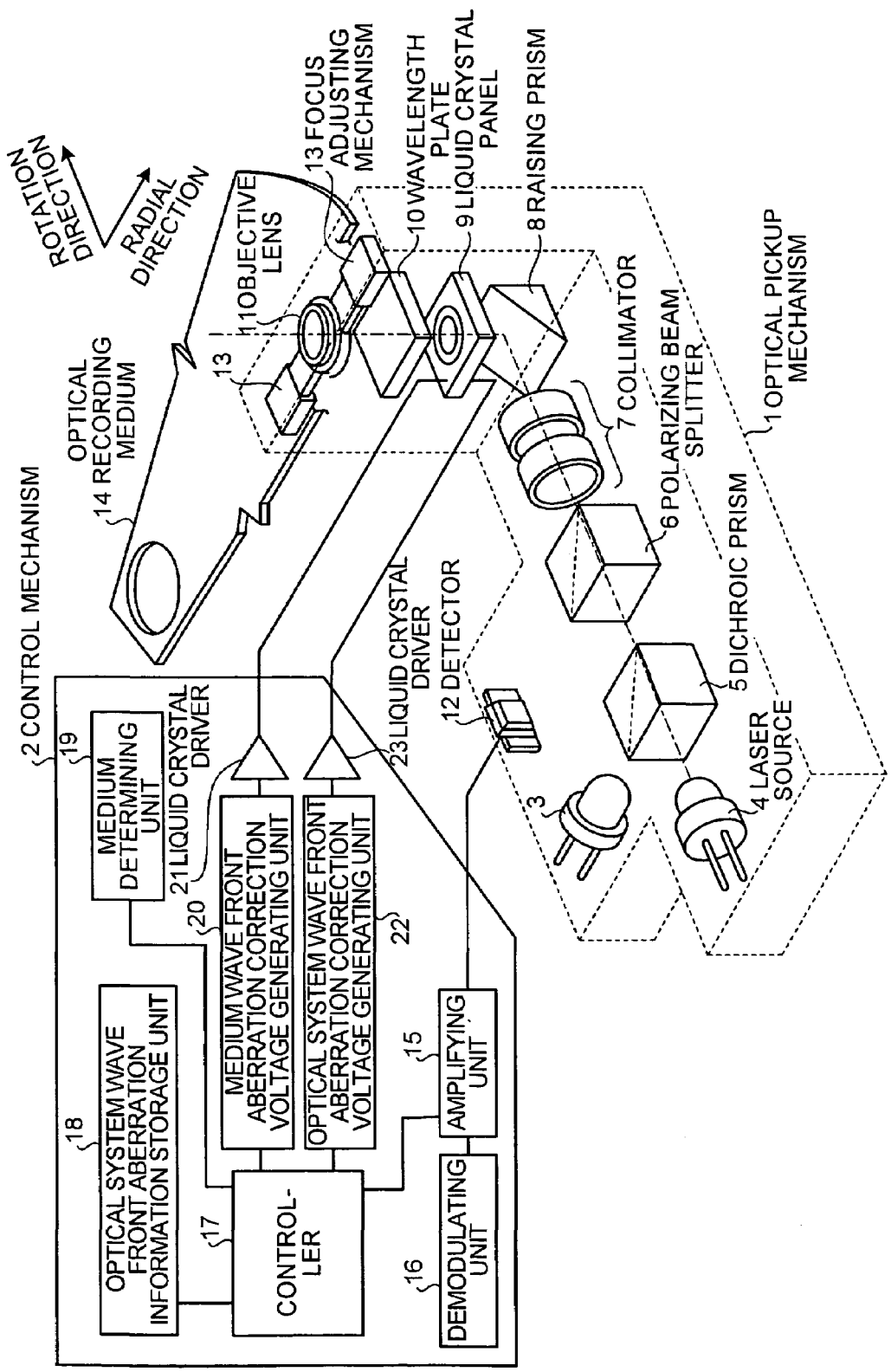
FIG. 1 is a schematic diagram of an optical recording medium reproducing device according to a first embodiment of the present invention.

FIG. 1 is a schematic diagram of an optical recording medium reproducing device according to a first embodiment of the present invention. This optical recording medium reproducing device includes an optical pickup mechanism 1 that has a function of irradiating a laser beam on the optical recording medium 14 and receiving a return light from the optical recording medium 14, and a control mechanism 2 that has a function of controlling a driving state of the optical pickup mechanism 1 and reproducing information based on the return light acquired in the optical pickup mechanism 1.

The optical pickup mechanism 1 includes laser sources 3 and 4 that are used according to the kind of the optical recording medium 14, a dichroic prism 5 that is sequentially positioned on optical paths of the laser beams emitted from the laser sources 3 and 4, a polarizing beam splitter 6, a collimator 7, a raising prism 8, a liquid crystal panel 9 that functions as an aberration correcting unit, a wavelength plate 10, and an objective lens 11. The optical pickup mechanism 1 includes a detector 12 that receives a return light split in the polarizing beam splitter 6, and a focus adjusting mechanism 13 that has a function such as focus adjustment of the objective lens 11. In the first embodiment, constituents of the optical pickup mechanism 1 other than the laser sources 3, 4, and the detector 12 may be referred to as an optical system. It is noted that the optical system may employ any structure having a function of forming a spot on an irradiated surface based on a light output from the light source, and is not limited to the structure shown in FIG. 1.

The laser sources 3 and 4 each have a function of outputting a laser beam with a wavelength optimized for the optical recording medium 14 to be read. In the first embodiment, a DVD or BD is used as one example of the optical recording medium 14 to be read, the laser source 3 outputs a blue laser beam corresponding to the BD, and the laser source 4 outputs a red laser beam corresponding to the DVD.

The dichroic prism 5 reflects a laser beam output from the laser source 3 to change the traveling direction by 90 degrees, while transmits a laser beam output from the laser source 4, so that the respective laser beams are incident in the polarizing beam splitter 6 or the like. Specifically, the dichroic prism 5 has light transmission characteristics corresponding to the wavelength of the incident light to reflect substantially 100% of the blue laser beam output from the laser source 3, while having characteristics where a reflectivity of the red laser beam output from the laser source 4 is substantially 0%.

The polarizing beam splitter 6 transmits the laser beams output from the laser sources 3 and 4, while reflecting and introducing a return light from the optical recording medium 14 to the detector 12. Specifically, the polarizing beam splitter 6 has light transmission characteristics corresponding to the polarization direction of the incident light, and has characteristics of transmitting substantially 100% of the laser beam with a predetermined polarization direction output from the laser source 3 or 4 and reflecting substantially 100% of a return light with a polarization direction that is rotated by a predetermined angle relative to the polarization direction. The dichroic prism 5 and the polarizing beam splitter 6 are employed in the first embodiment in terms of suppression of optical loss, but a structure of a half mirror or the like may be simply employed.

The collimator 7 converts a laser beam output from the laser source 3 or 4 into a parallel light flux. Thus the laser beam that passed through the collimator 7 travels as a parallel beam until it is refocused by the objective lens 11.

The raising prism 8 reflects the laser beam that passed through the collimator 7 and changes the traveling direction of the laser beam into the direction orthogonal to the surface of the optical recording medium 14. The optical system can be constituted so that the laser beam travels in the direction orthogonal to the surface of the optical recording medium 14 when it passes through the collimator 7, but in the first embodiment the optical system can be constituted so that the laser beam travels halfway in the direction parallel to the surface of the optical recording medium 14 and then changes the traveling direction by the raising prism 8 to avoid enlargement of the entire device.

The liquid crystal panel 9 reduces, and more preferably eliminates a phase difference of a passing laser beam, and restricts the degree of a wavefront aberration, which occurs when the laser beam forms a spot on the optical recording medium 14 within a permissible range. A specific structure of the liquid crystal panel 9 and operations thereof will be explained below in detail.

The wavelength plate 10 converts a laser beam incident in a linearly polarized state into a circularly polarized state. According to the first embodiment, since a laser beam irradiated on the optical recording medium 14 is required to be in the circularly polarized state, the polarized state is converted by the wavelength plate 10. The wavelength plate 10 acts on a return light, and polarizes a return light from the circularly polarized state into the linearly polarized state. The polarization direction of the return light after conversion is rotated by a predetermined angle relative to the polarization direction of the laser beam before being incident in the wavelength plate 10, and the rotation of the polarization direction allows the return light to be reflected on the polarizing beam splitter 6 and to be incident in the detector 12.

The objective lens 11 focuses laser beams converted into parallel beams by the collimator 7, and forms a spot with a predetermined diameter on the recording layer within the optical recording medium 14. FIG. 1 depicts a state where the objective lens 11 is constituted as a single lens, but it may be constituted by lenses. Any lens shape can be employed.

The focus adjusting mechanism 13 deals with a displacement of the spot forming position in an optical axis direction caused by a difference in the kind of the optical recording medium 14 and adjusts the focus of the objective lens 11. According to the first embodiment, the focus adjusting mechanism 13 has a function of finely adjusting the position of the objective lens 11 in a tracking direction (a radial direction in the mechanism where the optical recording medium 14 has a disc shape and rotates about the center of the disc) to follow the recording spot within the recording layer. The focus adjusting mechanism 13 may have only the focus adjusting function, and the fine adjustment of the objective lens 11 in the tracking direction may be performed by another mechanism.

The detector 12 receives a return light from the optical recording medium 14 and outputs an electric signal corresponding to the received return light to the control mechanism 2. Specifically, the detector 12 is formed to include a photodiode, for example.

As shown in FIG. 1, the control mechanism 2 includes an amplifying unit 15 that amplifies an electric signal output from the detector 12, a demodulating unit 16 that demodulates an amplified electric signal, a controller 17, to which an amplified electric signal is input, that performs a control based on the electric signal or the like in addition to general driving controlling, an optical system wavefront aberration information storage unit 18 that stores information on an optical system wavefront aberration described later and outputs the information to the controller 17 as needed, and a medium determining unit 19 that determines the type or the like of the optical recording medium 14 to be reproduced and outputs the determination information to the controller 17. Further, the control mechanism 2 includes a medium wavefront aberration correction voltage generating unit 20 that generates a voltage for correcting a medium wavefront aberration described later based on an instruction from the controller 17, and a liquid crystal driver 21 that transmits the generated voltage to the liquid crystal panel 9. Moreover, the control mechanism 2 includes an optical system wavefront aberration correction voltage generating unit 22 that generates a voltage for correcting an optical system wavefront aberration based on an instruction from the controller 17, and a liquid crystal driver 23 that transmits the generated voltage to the liquid crystal panel 9.

The liquid crystal panel 9 provided in the optical pickup mechanism 1 will be explained. The liquid crystal panel 9 restricts, and more preferably eliminates the degree of a wavefront aberration which occurs in a laser beam irradiated on the recording layer in the optical recording medium 14, and restricts enlargement of a spot region formed on the recording layer by a laser beam. Since the wavefront aberration is generally caused by existence of optical components having different phases in a laser beam, the liquid crystal panel 9 reduces or eliminates the phase difference between the optical components, thereby restricting or eliminating occurrence of the wavefront aberration.

Figure 2A:
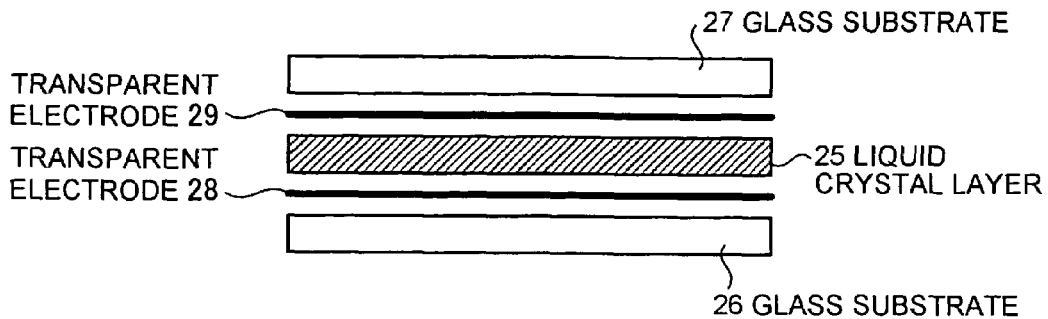
FIG. 2A is a side view of a liquid crystal panel.
Figure 2B:
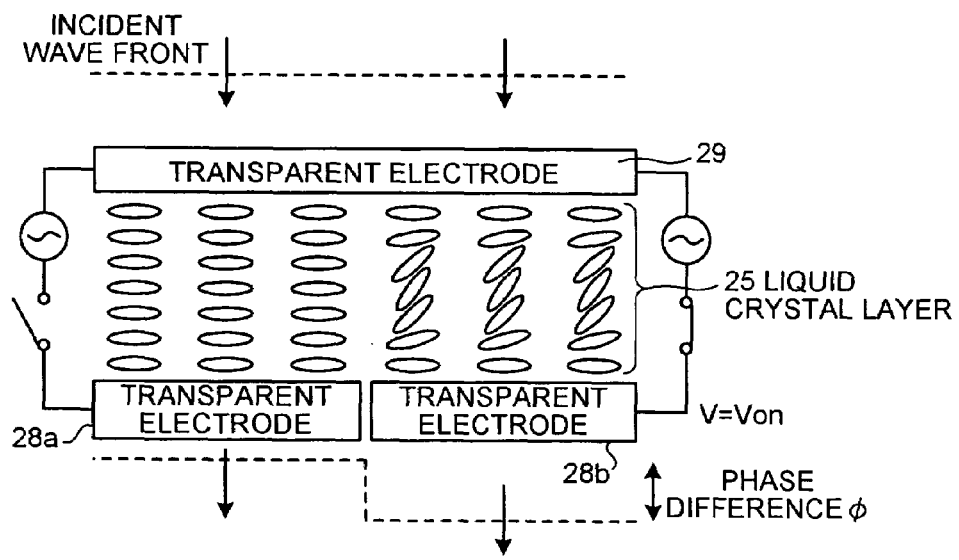
FIG. 2B is a schematic diagram for explaining the operation of the liquid crystal panel shown in FIG. 2.
Figure 2C:
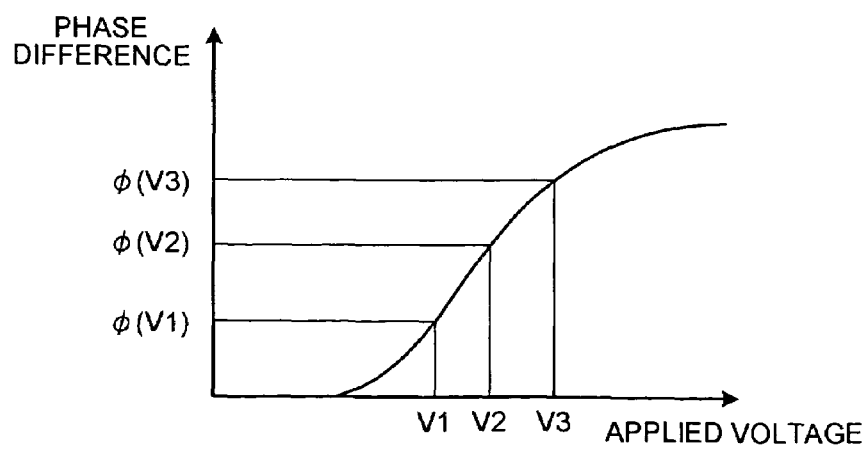
FIG. 2C is a graph of a voltage applied to a transparent electrode provided in the liquid crystal panel and a phase difference which occurs in a transmitted light.

FIG. 2A is a side view of the liquid crystal panel 9, FIG. 2B is a diagram for explaining an operation principle of the liquid crystal panel 9, and FIG. 2C is a graph of a voltage applied to the liquid crystal panel and a phase difference. As shown in FIG. 2A, the liquid crystal panel 9 includes a liquid crystal layer 25 containing liquid crystal molecules, and glass substrates 26 and 27 positioned to sandwich the liquid crystal layer 25. Transparent electrodes 28 and 29 each including a predetermined electrode pattern are formed on the inner surfaces (surfaces in contact with the liquid crystal layer 25) of the glass substrates 26 and 27, respectively.

The operation principle of the liquid crystal panel 9 will be explained. The liquid crystal molecules contained in the liquid crystal layer 25 have characteristics where the molecule structure has anisotropy so that an index of light refraction is changed according to the incident direction relative to a molecule. Since the orientation, which is the direction of the long axis of the liquid crystal molecule, changes due to an electric field applied to the liquid crystal molecule, a predetermined voltage is applied between the transparent electrodes 28 and 29, thereby controlling the index of light refraction in the liquid crystal layer 25.

FIG. 2B depicts a simple operation model. Specifically, the potential of the transparent electrode 29 is maintained at V=0, while the opposite transparent electrode 28 is divided into two transparent electrodes 28a and 28b, and the potentials V=0 and V=Von (≠0) are supplied to the transparent electrode 28a and the transparent electrode 28b, respectively. With this structure, the index of refraction in the region sandwiched by the transparent electrodes 28b and 29 in the liquid crystal layer 25 maintains the initial value no, while the orientation of the liquid crystal molecules is changed due to the potential difference Von in the region sandwiched by the transparent electrodes 28a and 29 and the index of refraction is changed to $n_1$ ($\neq n_0$). Since the optical path length is given by a product of a physical length and an index of refraction, the physical length maintains a constant value, while the optical path length is changed according to the change in the index of refraction in the state shown in FIG. 2B. Therefore, in the structure shown in FIG. 2B, a light passing through the region sandwiched by the transparent electrodes 28a and 29 and a light passing through the region sandwiched by the transparent electrodes 28b and 29 pass through the optical path lengths different from each other so that the wave fronts of the output transmission beams generate a displacement corresponding to the difference between the optical path lengths as shown in FIG. 2B.

The liquid crystal panel 9 utilizes the principle to generate the change in the index of refraction, which eliminates the phase difference originally provided in the liquid crystal layer 25 relative to the light flux where the phase difference already occurs so as to restrict the phase difference within the permissible range. The relationship between the applied voltage and the generated phase difference is different depending on the thickness of the liquid crystal layer 25, the kind of the liquid crystal molecules forming the liquid crystal layer 25, or the like, but it is generally in a monotone increasing relationship as shown in FIG. 2C. Therefore, control is performed such that the applied voltage is made larger when a light incident in the liquid crystal panel 9 has a large phase difference, and the applied voltage is made smaller when the phase difference is small, thereby controlling the phase difference as a whole within the permissible range.

The optical recording medium reproducing device according to the first embodiment is constituted so that the voltage control on the liquid crystal panel 9 is performed by the control mechanism 2. In the first embodiment, when the voltage control is performed, the wavefront aberration is interpreted by an optical system wavefront aberration, which occurs due to the mechanism in the optical pickup mechanism 1 such as optical axis offset and a medium wavefront aberration, which occurs due to the optical recording medium 14 such as structural distortion. The voltage control is performed independently relative to the respective wavefront aberrations. In other words, the specific structure of the optical pickup mechanism 1 has a structure where an inclination of the objective lens 11, an inclination of an optical component in each portion, and the like are optimized such that the wavefront aberration does no occur within the optical pickup mechanism 1 with respect to a blue laser beam output from the laser source 3. With this structure, since a red laser beam output from the laser source 4 is difficult to be completely matched with a blue laser beam in the optical axis, it is difficult to avoid occurrence of a slight wavefront aberration. Therefore, when a red laser beam is used, that is, a DVD is used as the optical recording medium 14, it is preferable to restrict the degree of occurrence of the optical system wavefront aberration to a permissible range.

On the other hand, the medium wavefront aberration, which occurs due to the optical recording medium 14, can correct the wavefront aberration whether the laser source 3 is used or the laser source 4 is used. In other words, a change in the shape or the like occurs to some degree or another depending on the kind of the optical recording medium 14. Thus a structure capable of an aberration correction can be employed for all the optical recording mediums 14.

In the first embodiment, in terms of the circumstances, the control mechanism 2 is constituted to include the medium wavefront aberration correction voltage generating unit 20 that controls a medium wavefront aberration within the permissible range and the optical system wavefront aberration correction voltage generating unit 22 that operates independent of the medium wavefront aberration correction voltage generating unit 20 and controls an optical system wavefront aberration within the permissible range. In the first embodiment, in correspondence to the control mechanism 2 that performs wavefront aberration correction in two systems, and in the liquid crystal panel 9 provided in the optical pickup mechanism 1, the two transparent electrodes 28 and 29 positioned at both sides of the liquid crystal layer 25 have a predetermined pattern. Specifically, the transparent electrode 28 is constituted to have a voltage distribution according to voltage information generated by the optical system wavefront aberration correction voltage generating unit 22, and the transparent electrode 29 is constituted to have a voltage distribution according to voltage information generated by the medium wavefront aberration correction voltage generating unit 20.

Figure 3A:
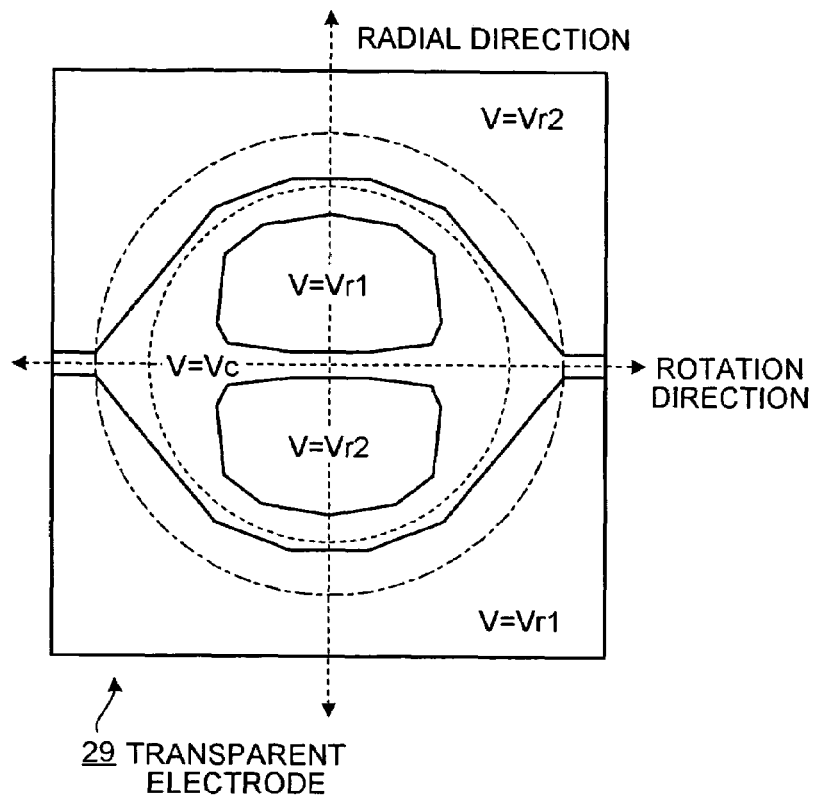
FIG. 3A is a schematic diagram of an electrode pattern of a transparent electrode used for correcting a medium wavefront aberration.

Next, the electrode patterns in the transparent electrodes 28 and 29 will be explained. FIG. 3A is a schematic diagram of one example of the electrode pattern of the transparent electrode 29 used for correcting the medium wavefront aberration, and FIG. 3B is a schematic diagram of one example of the electrode pattern of the transparent electrode 28 used for correcting the optical system wavefront aberration.

Figure 3B:
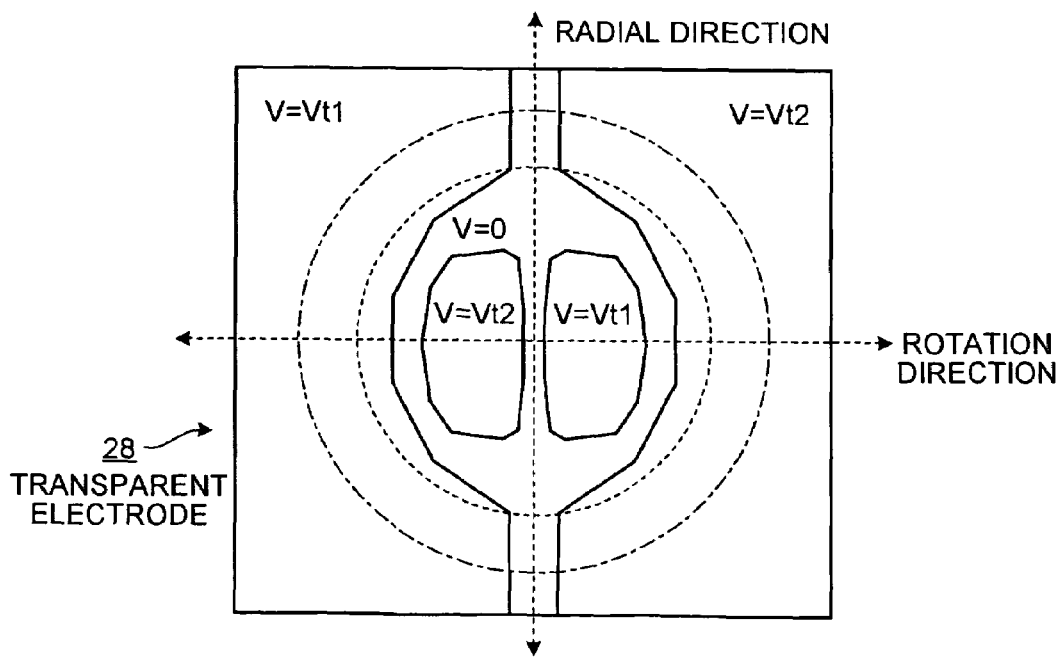
FIG. 3B is a schematic diagram of an electrode pattern of a transparent electrode used for correcting an optical system wavefront aberration.

The concentric circles formed by a dashed line and a chain line in FIGS. 3A and 3B indicate the passing ranges of the laser beams used for reading a DVD and a BD, respectively. In other words, the laser beams on passing through the liquid crystal panel 9 are in a parallel beam state under the operation of the collimator 7, and a spot with a predetermined diameter is formed after passing through the objective lens 11. With respect to the spot forming, only a light flux that passes through the region surrounded by the dashed line and the region surrounded by the chain line is focused by the objective lens 11 among the laser beams output from the laser sources 3 and 4 and contributes to the spot forming.

Rotation direction and radial direction in FIGS. 3A and 3B indicate the same directions as the rotation direction and the radial direction in FIG. 1, respectively. In other words, the horizontal axis in FIGS. 3A and 3B indicates a direction corresponding to the rotation direction when the optical recording medium 14 has a disc shape, and the vertical direction corresponds to the radial direction when the optical recording medium 14 has a disc shape, that is, the tracking direction for the optical pickup mechanism 1.

The transparent electrode 29 is used for correcting the medium wavefront aberration which occurs due to the shape or the like of the optical recording medium 14, as explained above. Since the medium wavefront aberration occurs in both a DVD and a BD, the transparent electrode 29 has a shape for reading both of the optical recording mediums 14. When the medium wavefront aberration occurs due to, particularly, the shape change in the optical recording medium 14 with a disc shape, an incline in the radial direction generally occurs between the optical recording medium 14 and the optical pickup. Therefore, in the first embodiment, the transparent electrode 29 employs a structure where the voltage corresponding to the aberration can be applied to compensate for the aberration that occurs due to the change in the shape or the like of the optical recording medium 14 that may occur in the radial direction. Therefore, the transparent electrode 29 in the first embodiment has the shape shown in FIG. 3A such that it can correspond to both of the DVD and the BD and can apply an appropriate voltage for correcting the aberration that occurs due to the incline in the radial direction.

The electrode pattern shown in FIG. 3A is formed for restricting the degree of occurrence of a comatic aberration occurring in the radial direction among various kinds of wavefront aberrations. Therefore, an electrode pattern having a shape corresponding to a new wavefront aberration is used in the optical recording medium 14 where different wavefront aberrations are actualized, and the electrode pattern shown in FIG. 3A is only one example. The occurrence of a comatic aberration in the radial direction can be a problem in the optical recording medium 14 that is practicable at this time, such as the BD, DVD, CD, or AOD, and the electrode pattern shown in FIG. 3A has versatility in this light.

On one hand, the transparent electrode 28 shown in FIG. 3B is used for correcting the optical system wavefront aberration due to an optical axis offset in the optical pickup mechanism 1. As explained above, the optical pickup mechanism 1 is adjusted to be optimized for a BD, and the degree of occurrence of the optical system wavefront aberration is remarkably restricted in advance when the BD is used as the optical recording medium 14. Thus, the need of correction is not required. On the other hand, since the optical system in the optical pickup mechanism 1 is designed for a BD and is not necessarily optimized for a DVD, some degree of occurrence of the optical system wavefront aberration can arise. Therefore, the transparent electrode 28 in the first embodiment may have a function of correcting the optical system wavefront aberration actualized in using a DVD as shown in FIG. 3B, and is formed to eliminate an aberration within the region with the dashed line used for the spot forming in using the DVD.

The transparent electrode 28 has the electrode pattern shown in FIG. 3B such that the occurrence of a comatic aberration in the rotation direction is restricted as one example of the optical system wavefront aberration in the first embodiment. However, a wavefront aberration other then a comatic aberration may occur as a possible optical system wavefront aberration depending on the structure or the like of the objective lens 11, and the electrode pattern corresponding to a different wavefront aberration can be used in this case. Therefore, it should be noted that the electrode pattern shown in FIG. 3B is only one example corresponding to a certain kind of wavefront aberration.

Figure 4:
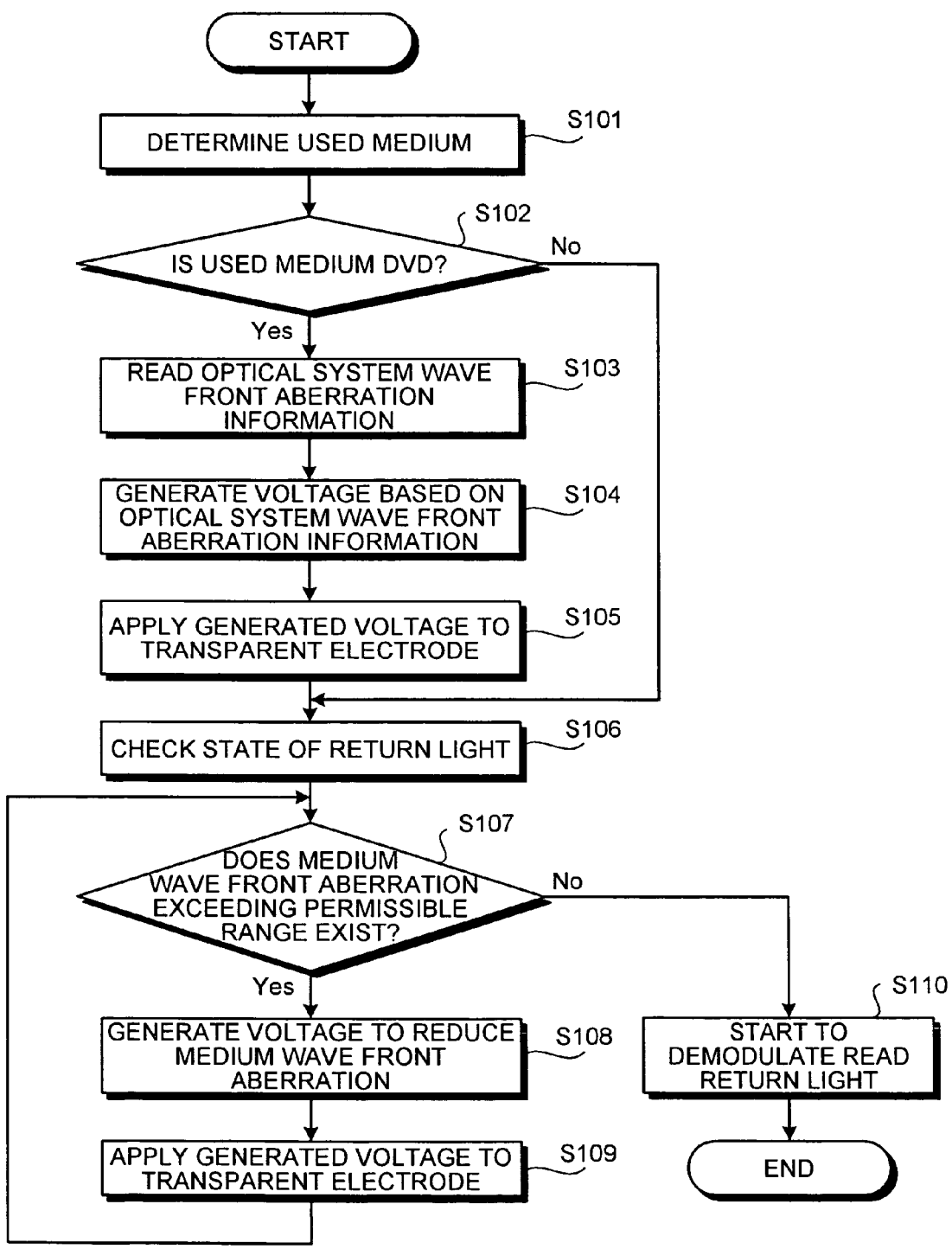
FIG. 4 is a flowchart for explaining a process procedure performed by a control mechanism shown in FIG. 1.

Next, the operation of the optical recording medium reproducing device according to the first embodiment, and more specifically the operation of the control mechanism 2 in reproducing information of the optical recording medium 14, will be explained. FIG. 4 is a flowchart for explaining the operation of the control mechanism 2.

First, the kind of the optical recording medium 14 to be used for reading is determined (step S101). Specifically, the medium determining unit 19 provided in the control mechanism 2 determines whether the optical recording medium 14 to be read is a DVD or a BD, and the determination result is output to the controller 17.

The controller 17 determines whether the optical recording medium 14 in use is a DVD based on the information input from the medium determining unit 19 (step S102). When it is determined to be a DVD, optical system wavefront aberration information stored in the optical system wavefront aberration information storage unit 18 is read (step S103). On the other hand, when the controller 17 determines that the optical recording medium 14 in use is not a DVD, that is, the optical recording medium 14 in use is a BD, the processing proceeds to step S106 described later.

Thereafter, the controller 17 outputs the read optical system wavefront aberration information to the optical system wavefront aberration correction voltage generating unit 22, and the optical system wavefront aberration correction voltage generating unit 22 generates a correction voltage based on the information (step S104). The generated correction voltage is transmitted to the liquid crystal driver 23, and the liquid crystal driver 23 applies the voltage to the transparent electrode 29 (step S105). When the voltage is applied, the index of refraction in the liquid crystal layer 25 provided in the liquid crystal panel 9 is changed, the phase difference that causes the optical system wavefront aberration is reduced, and the optical system wavefront aberration is restricted within the permissible range.

Thereafter, a laser beam is irradiated on the optical recording medium 14 in a state where the optical system wavefront aberration is restricted at the step, and a state of a return light from the optical recording medium 14, which is received in the detector 12, is checked (step S106). Determinations are made as to whether a wavefront aberration occurs from the state of the return light, and whether the degree of the wavefront aberration exceeds the permissible range (step S107). Since the occurrence of the optical system wavefront aberration is restricted at steps S101 to S105, the wavefront aberration that can be observed in this step is a medium wavefront aberration caused by a change in the shape or the like of the optical recording medium 14. When it is determined that the degree of occurrence of the medium wavefront aberration is restricted within the permissible range, the processing proceeds to step S110.

On the other hand, when it is determined that the degree of the medium wavefront aberration exceeds the permissible range, the optical system wavefront aberration correction voltage generating unit 22 generates a correction voltage to reduce the medium wavefront aberration according to an instruction from the controller 17 (step S108). The correction voltage is output to the liquid crystal driver 21, and the liquid crystal driver 21 applies the voltage to the transparent electrode 28 (step S109). When the voltage is applied, the index of refraction of the liquid crystal layer 25 provided in the liquid crystal panel 9 is changed, the phase difference that causes the medium wavefront aberration is reduced, and the degree of occurrence of the medium wavefront aberration is reduced. The processing returns to step S107 after this step is completed, and the degree of the medium wavefront aberration is determined again. Therefore, the steps S108 and S109 are continuously performed until the degree of the medium wavefront aberration is restricted within the permissible range.

When it is determined that the degree of occurrence of the medium wavefront aberration is restricted within the permissible range in step S107, it is determined that the correction of the wavefront aberration is completed, and the demodulating unit 16 demodulates the information based on an electric signal which is acquired from the return light (step S110). The information recorded in the optical recording medium 14 is reproduced by the operation of the demodulating unit 16, and speech data or image data, for example, is output to the outside. The operation of the control mechanism 2 is terminated.

As explained above, the optical recording medium reproducing device according to the first embodiment separates wavefront aberrations into an optical system wavefront aberration, which occurs due to a structural factor of the optical pickup mechanism 1, and a medium wavefront aberration, which occurs due to a structural factor of the optical recording medium 14, and independently performs aberration corrections on the respective wavefront aberrations. Thus, in the first embodiment, control for reducing or eliminating a wavefront aberration can be performed easily and accurately.

As explained above, a wavefront aberration is generated due to existence of a region having a difference phase in a light flux in a laser beam output from the laser source, but it is difficult to confirm directly a phase distribution or an enlargement of an area of a spot formed on the optical recording medium 14. Therefore, a conventional optical recording medium reproducing device changes an applied voltage to a transparent electrode provided in a liquid crystal panel at random or according to a predetermined algorithm, based on information acquired from a return light received in the detector 12 such as an amplitude of a reproduction signal, an amplitude of a tracking error signal, a reproduction jitter or an error rate, or applies an equally defined voltage.

However, there is a problem that aberration correction can take a long time when the applied voltage is randomly changed. The algorithm is difficult to construct when the applied voltage is determined according to the predetermined algorithm based on the information on the return light, particularly when a wavefront aberration occurs due to a complex factor as in the first embodiment. Further, when the equally defined voltage is applied, there is a problem that wavefront aberration correction with high accuracy cannot be performed, which corresponds to the optical recording medium 14 having various distortions in the shape, for example.

The optical recording medium reproducing device according to the first embodiment employs a structure of assuming an optical system wavefront aberration and a medium wavefront aberration as main possible wavefront aberrations, and independently performing aberration correction on both the aberrations. Since the optical system wavefront aberration occurs due to the structure of the optical pickup mechanism 1, how the causal phase difference occurs can be made clear during designing or immediately after actual manufacturing. Therefore, with respect to the optical system wavefront aberration, the electrode pattern and the applied voltage for reducing the phase difference which causes the wavefront aberration can be defined in advance before the optical recording medium 14 is used to actually read the recorded information.

Therefore, in the first embodiment, the electrode pattern and the applied voltage, which are defined in advance, are used for the optical system wavefront aberration, and this method is used uniformly to perform correction of the wavefront aberration without referring to the amplitude of a reproduction signal acquired from the return light. In other words, the constituents of the optical system such as the dichroic prism 5 to the detector 12 provided in the optical pickup mechanism 1 do not vary in the mutual positional relationship as long as a physical damage or the like does not occur, or if any, slightly varies. Thus, since a phase difference occurs in the light flux due to the optical axis offset, and the contents and the degree of the optical system wavefront aberration that occurs based on the phase difference are substantially constant, the optical system wavefront aberration can be corrected rapidly and highly-accurately using the predefined value uniformly.

In the first embodiment, the correction of the medium wavefront aberration and the correction of the optical system wavefront aberration are performed independently so that the correction of the medium wavefront aberration can be performed easily and rapidly. In other words, when the medium wavefront aberration correction is performed, the aberration correction can be performed in consideration of only the aberration caused by the optical recording medium 14 and the aberration correcting mechanism can be simplified.

A main factor of the occurrence of the medium wavefront aberration is that the shape of the optical recording medium 14 has no distortion in the rotation direction, while a distortion occurs in the radial direction. When a wavefront aberration occurs due to the distortion, the irradiated surface in the optical recording medium 14, that is, the light flux that forms a spot on the recording layer, generates an aberration in the radial direction, while generating no aberration in the rotation direction, or if any, restricting it to being equal to or less than the permissible range.

Therefore, the correction for reducing the aberration in the radial direction may be performed in the liquid crystal panel 9 to correct the medium wavefront aberration in this case, and the correction of the wavefront aberration can be rapidly performed with a simple structure as compared with the case where the aberration occurs in two directions.

In the first embodiment, since the correcting mechanism of the medium wavefront aberration may have the function of correcting the medium wavefront aberration and does not require consideration of the optical system wavefront aberration, a structure that specializes in the medium wavefront aberration correcting function can be employed. Thus, the electrode pattern of the transparent electrode 29 in the first embodiment can employ a pattern that is optimal for the correction of the medium wavefront aberration, and the liquid crystal panel 9 provided with the transparent electrode 29 can accurately correct the medium wavefront aberration.

The optical recording medium reproducing device according to the first embodiment employs the structure of separating the wavefront aberrations into the optical system wavefront aberration and the medium wavefront aberration and performing corrections thereon, thereby correcting the wavefront aberrations rapidly and accurately. In other words, though the structure of correcting the wavefront aberrations is employed, the respective aberration corrections can be performed with a simple structure so that the rapid wave front correction can be performed as compared with a conventional one of correcting the entire wavefront aberration. The structure where the respective correcting mechanisms are optimized for each wavefront aberration is employed so that the aberration correction can be performed more accurately as compared with a conventional one.

According to the first embodiment having the structure of independently performing the correction of the optical system wavefront aberration and the correction of the medium wavefront aberration, the correction of the medium wavefront aberration can be performed after the correction of the optical system wavefront aberration is performed. With the correction of the wavefront aberrations in this order, the wavefront aberration corrections can be performed more accurately and more rapidly.

The correction of the medium wavefront aberration requires the aberration correction corresponding to the individual optical recording medium 14 to be used unlike the optical system wavefront aberration because a distortion in the shape or the like is generally different for each optical recording medium 14. Thus, the applied voltage is changed based on the amplitude of the reproduction signal acquired from the return light as one aspect of the aberration correction. The optimal applied voltage is difficult to determine particularly when the amplitude of the reproduction signal or the like is evaluated in the state where the optical system wavefront aberration and the medium wavefront aberration coexist.

However, the first embodiment employs the structure of performing the correction of the medium wavefront aberration after the correction of the optical system wavefront aberration is completed so that the amplitude of the reproduction signal or the like in the medium wavefront aberration correction reflects only the medium wavefront aberration. Therefore, when the medium wavefront aberration correction is performed based on the amplitude of the reproduction signal or the like, the correction can be performed irrespective of other aberration factors, and the aberration correction can be performed rapidly and accurately.

The structure of independently correcting the optical system wavefront aberration and the medium wavefront aberration has another positive aspect. In other words, in the optical pickup mechanism 1 according to the first embodiment, the optical system mechanism is optimized for the state where a BD is used as the optical recording medium 14 as explained above, and the degree of occurrence of the optical system wavefront aberration is restricted to a permissible range in the state where the aberration correction is not performed when the BD is read. Thus, the optical recording medium reproducing device according to the first embodiment performs only the correction of the medium wavefront aberration as needed without performing the correction of the optical system wavefront aberration when the information recorded in the BD is read, thereby performing the aberration correction rapidly.

In the first embodiment, the corrections of the medium wavefront aberration and the optical system wavefront aberration are performed by the single liquid crystal panel 9. The corrections of both the wavefront aberrations are performed by the single liquid crystal panel 9 so that the structure of the optical pickup mechanism 1 can be made smaller as compared with the case where a plurality of correcting units are provided in correspondence to the respective wavefront aberrations.

The aberration correction is performed by the single liquid crystal panel 9 so that attenuation in the light intensity of the laser beam in the optical pickup mechanism 1 can be advantageously restricted. Since the glass substrates constituting the liquid crystal panel have some degree of reflectivity and light absorption or light scattering occurs also in the inside liquid crystal layer, the arrangement of the liquid crystal panel on the optical path of the laser beam causes attenuation in the laser beam intensity. Therefore, it is preferable that the number of liquid crystal panels to be arranged on the optical path of the laser beam is small, and the aberration correction is performed by the single liquid crystal panel as in the first embodiment so that the attenuation in the laser beam intensity can be limited.

Next, there will be explained using the transparent electrode 29 for the correction of the medium wavefront aberration on two kinds of optical recording mediums 14 such as a BD and a DVD. In the first embodiment, only the single transparent electrode 29 (and the liquid crystal layer 25) is used to perform the correction of the medium wavefront aberration in the several kinds of optical recording mediums 14 without providing correcting units corresponding to the respective kinds of optical recording mediums 14. Of concern is that a sufficient aberration correction cannot be performed on the several kinds of optical recording mediums 14 by the single correcting unit, but the present inventors confirm that the function of correcting the medium wavefront aberration in the optical recording medium reproducing device according to the first embodiment has no problem by deriving a numerical calculation result.

Figure 5:
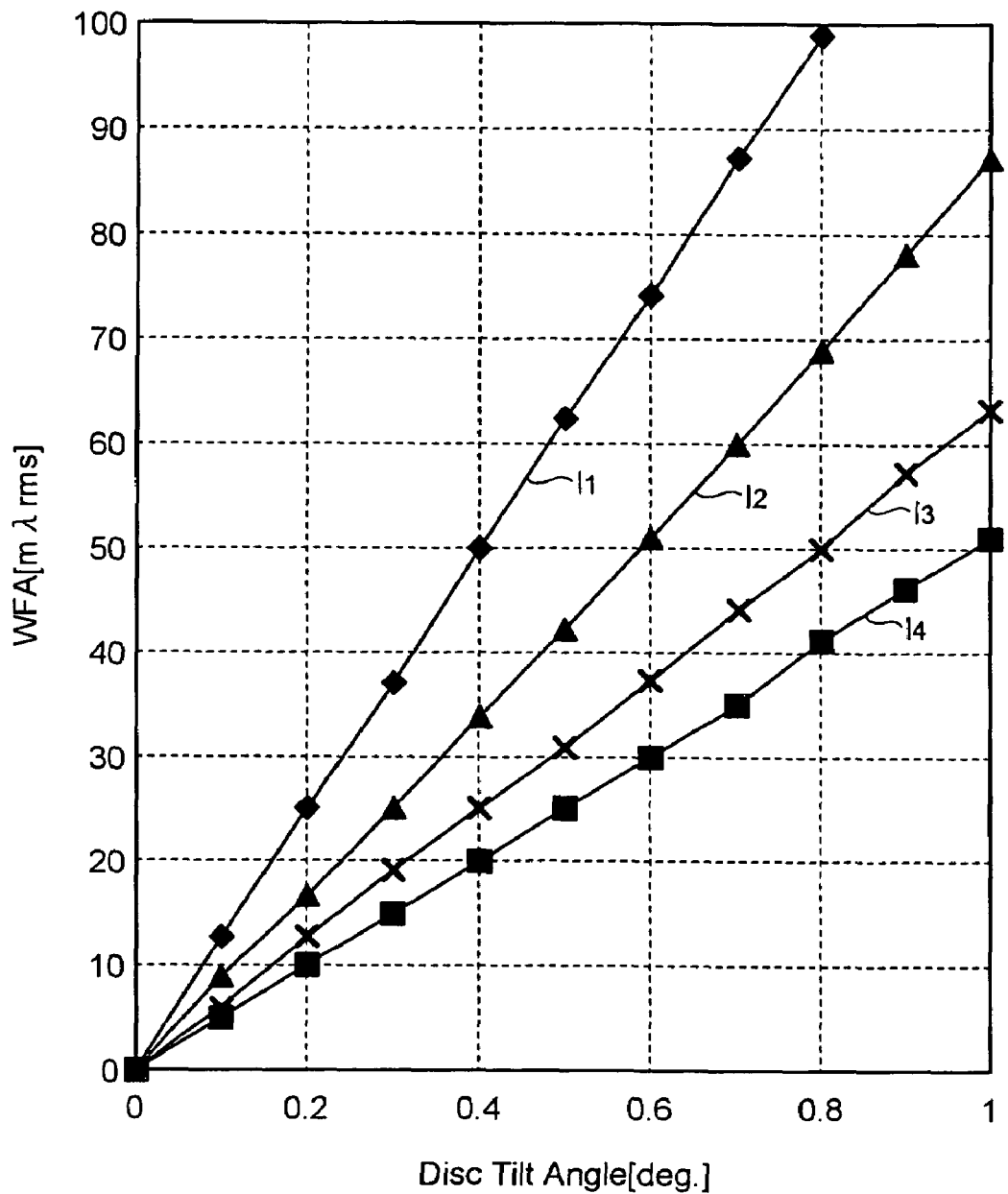
FIG. 5 is a graph of an inclination of an optical recording medium and a variance of a wavefront aberration in using a DVD.

FIG. 5 is a graph of an incline of the optical recording medium 14 relative to an irradiating beam and a wavefront aberration occurred when DVD is used as the optical recording medium 14. In the graph of FIG. 5, the horizontal axis indicates a value of a tilt angle (Disc Tilt Angle) from a design value of the surface constituting the recording layer in the optical recording medium 14, and the vertical axis indicates a variance of the wavefront aberration. As shown in FIG. 5, the curve $I_1$ indicates an optical recording medium reproducing device having no wavefront aberration correcting mechanism, and the curve $I_2$ indicates an optical recording medium reproducing device where the structure of the optical system and the electrode pattern of the transparent electrode provided in the liquid crystal panel are optimized for use of a BD. Specifically, the optical recording medium reproducing device indicating the result by the curve $I_1$ is different from the optical recording medium reproducing device according to the first embodiment in that it does not include the liquid crystal panel 9 that performs the correction of the wavefront aberration. Further, the optical recording medium reproducing device indicating the result by the curve $I_2$ is different from that according to the first embodiment in that the electrode pattern of the transparent electrode 29 provided in the liquid crystal panel has a shape optimized for a BD. The curve $I_3$ indicates the optical recording medium reproducing device according to the first embodiment, and the curve $I_4$ indicates an optical recording medium reproducing device having a structure where the electrode pattern of the liquid crystal panel, which is the wavefront aberration correcting mechanism, is optimized for only a DVD.

As shown in FIG. 5, since neither the optical recording medium reproducing device with no aberration correcting mechanism (curve $I_1$) nor the optical recording medium reproducing device (curve $I_2$) optimized for a BD includes the aberration correcting mechanism for a DVD, when the DVD is used as the optical recording medium 14, the variance of the wavefront aberration is made large for the incline from the design value of the optical recording medium 14. Since the variance of the wavefront aberration, which is considered to have no practical problem, is generally 70 mλrms, a practical problem occurs in the optical recording medium reproducing device with no aberration correcting mechanism when a DVD is used as the optical recording medium 14 has an incline on the order of 0.55 degrees. A practical problem occurs in the optical recording medium reproducing device with the aberration correcting mechanism optimized for a BD when the incline of the DVD reaches the order of 0.8 degree.

As indicated by the curve $I_3$, in the optical recording medium reproducing device according to the first embodiment, the variance of the wavefront aberration is on the order of 65 mλrms when the incline of DVD as the optical recording medium 14 reaches 1 degree, which is not a problem. In the first embodiment, the electrode pattern of the transparent electrode 29 used for correcting the medium wavefront aberration has a structure adaptable for both a DVD and a BD, and the variance of the wavefront aberration is higher than in the case of the curve $I_4$ optimized for only a DVD. However, when at least the structure according to the first embodiment is employed, no problem occurs.

Figure 6:
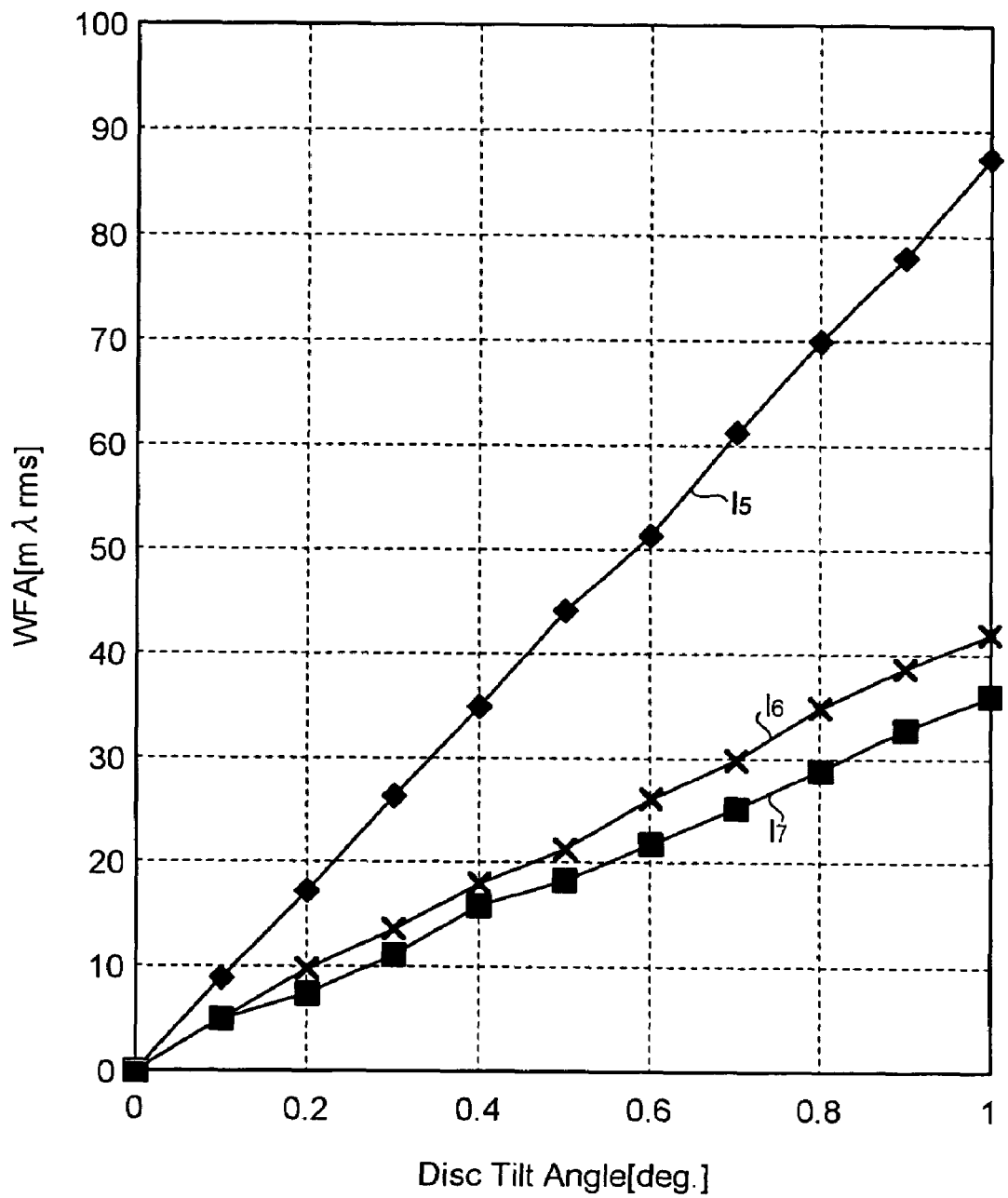
FIG. 6 is a graph of an inclination of the optical recording medium and a variance of the wavefront aberration in using a BD.

Next, the relationship between the incline of the optical recording medium 14 relative to an irradiating beam and the occurrence of wavefront aberration when a BD is used as the optical recording medium 14 will be explained while referring to FIG. 6. As shown in FIG. 6, the horizontal axis and the vertical axis are similar to those in FIG. 5, the curve I5 indicates the optical recording medium reproducing device with no aberration correcting mechanism, and the curve I6 indicates the optical recording medium reproducing device according to the first embodiment. The curve I7 indicates the optical recording medium reproducing device optimized for use of a BD (corresponding to the curve I2 in FIG. 5) without particular consideration of a DVD.

As shown in FIG. 6, in the optical recording medium reproducing device with no wavefront aberration correcting mechanism, the variance of the wavefront aberration reaches 70 mλrms when a BD used as the optical recording medium 14 is inclined at 0.8 degrees, while in the optical recording medium reproducing device according to the first embodiment, the variance is on the order of 40 mλrms even when the incline is 1 degree, so that it is seen that the variance of the wavefront aberration is restricted to a remarkably low value. Therefore, the optical recording medium reproducing device according to the first embodiment can correct the medium wavefront aberration with high accuracy not only when using a DVD but also when using a BD.

Next, a first variant of the optical recording medium reproducing device according to the first embodiment will be explained. In the first variant, the electrode pattern of the transparent electrode, which corrects the medium wavefront aberration, is devised to improve the function of correcting the medium wavefront aberration on a BD.

Figure 7A:
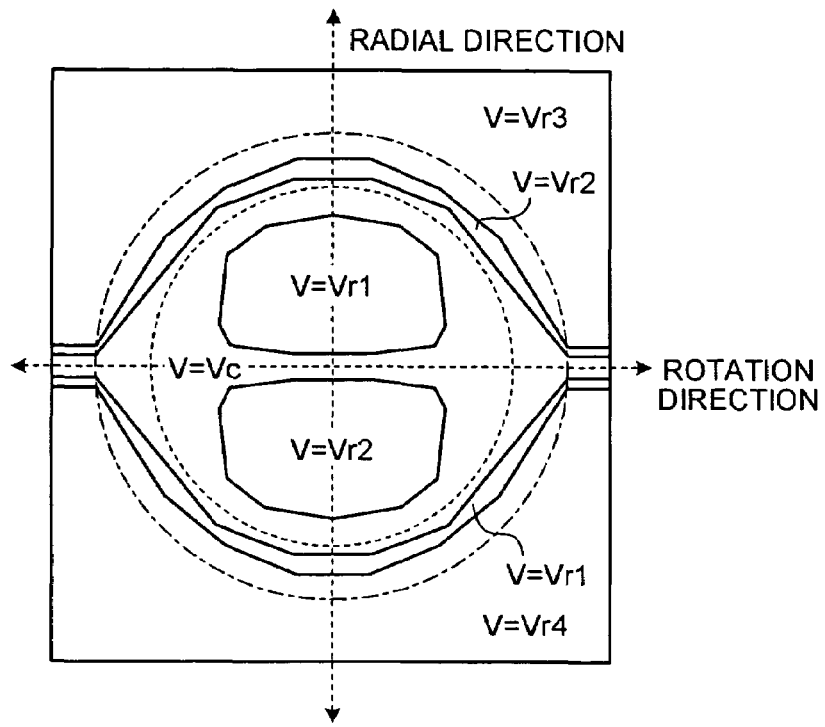
FIG. 7A is a schematic diagram of an electrode pattern of a transparent electrode used for correcting the medium wavefront aberration according to a first variant of the first embodiment.

FIG. 7A is a diagram of one example of the electrode pattern of the transparent electrode used for correcting the medium wavefront aberration according to the first variant. In the first variant, the transparent electrode 29 shown in FIG. 3A in the optical recording medium reproducing device according to the first embodiment is replaced with the transparent electrode shown in FIG. 7A.

As shown in FIG. 7A, in the first variant, a region where V=Vr1 and V=Vr2 are newly applied is added outside the region where the light flux that forms a spot when using a DVD passes through the transparent electrode (region surrounded by a dashed line in FIG. 7A) and in the region where the light flux that forms a spot when using a BD passes (region surrounded by a chain line in FIG. 7A). A region where V=Vr3 and V=Vr4 are applied exists further outside.

Figure 7B:
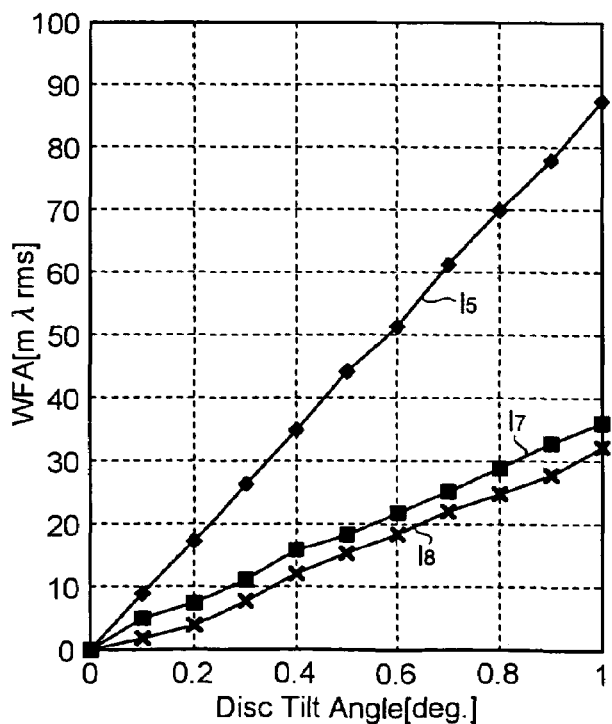
FIG. 7B is a graph of an inclination of the optical recording medium and a variance of the wavefront aberration in using a BD according to the first variant.

FIG. 7B is a graph of the result when the medium wavefront aberration correction on a BD is performed using the transparent electrode having the structure in FIG. 7A. As shown in FIG. 7B, the vertical axis and the horizontal axis are similar to those in FIGS. 5 and 6, and the curves $I_5$ and $I_7$ are identical to the curves in FIG. 6. The curve $I_8$ indicates the result on the optical recording medium reproducing device according to the first variant. As shown in FIG. 7B, the optical recording medium reproducing device according to the first variant can more accurately correct the medium wavefront aberration that occurs when using a BD, and can restrict the variance of the wavefront aberration to a lower value as compared with the case where the structure with no aberration correcting unit and the structure according to the first embodiment are used.

Even when the electrode pattern of the transparent electrode to be used for correcting the medium wavefront aberration is changed to the structure shown in FIG. 7A, the function of correcting the medium wavefront aberration in using a DVD is not lowered because, in the structure shown in FIG. 7A, the electrode pattern in the region where the light flux forming a spot in using a DVD passes is similar to that shown in FIG. 3A. Therefore, the optical recording medium reproducing device according to the first variant can improve the correcting function in using a BD without reducing the correcting function in using a DVD with respect to the correction of the medium wavefront aberration.

Next, a degree of a wavefront aberration that occurs when the positional relationship between the liquid crystal panel 9 and the objective lens 11 is displaced in the radial direction will be explained with respect to the optical recording medium reproducing device according to the first embodiment and the optical recording medium reproducing device according to the first variant. As shown in the first embodiment and the first variant, the focus adjusting mechanism 13 has a function of not only moving the objective lens 11 in the optical axis direction to perform focus adjustment but also moving the objective lens 11 in the radial direction (in the tracking direction in using a DVD or a BD) by a slight distance. When a laser beam is irradiated on the recording region that belongs to a different position in the radial direction on the optical recording medium 14, the mechanism 13 generally has a structure of moving the entire optical pickup mechanism 1. However, the focus adjusting mechanism has a function of moving only the objective lens 11 in the radial direction by a slight distance to follow the tracking, and when the objective lens 11 is slightly moved in the radial direction, the positional relationship between the liquid crystal panel 9 or the like and the objective lens 11 is displaced. The variance of the wavefront aberration when this displacement occurs will be evaluated below.

Figure 8:
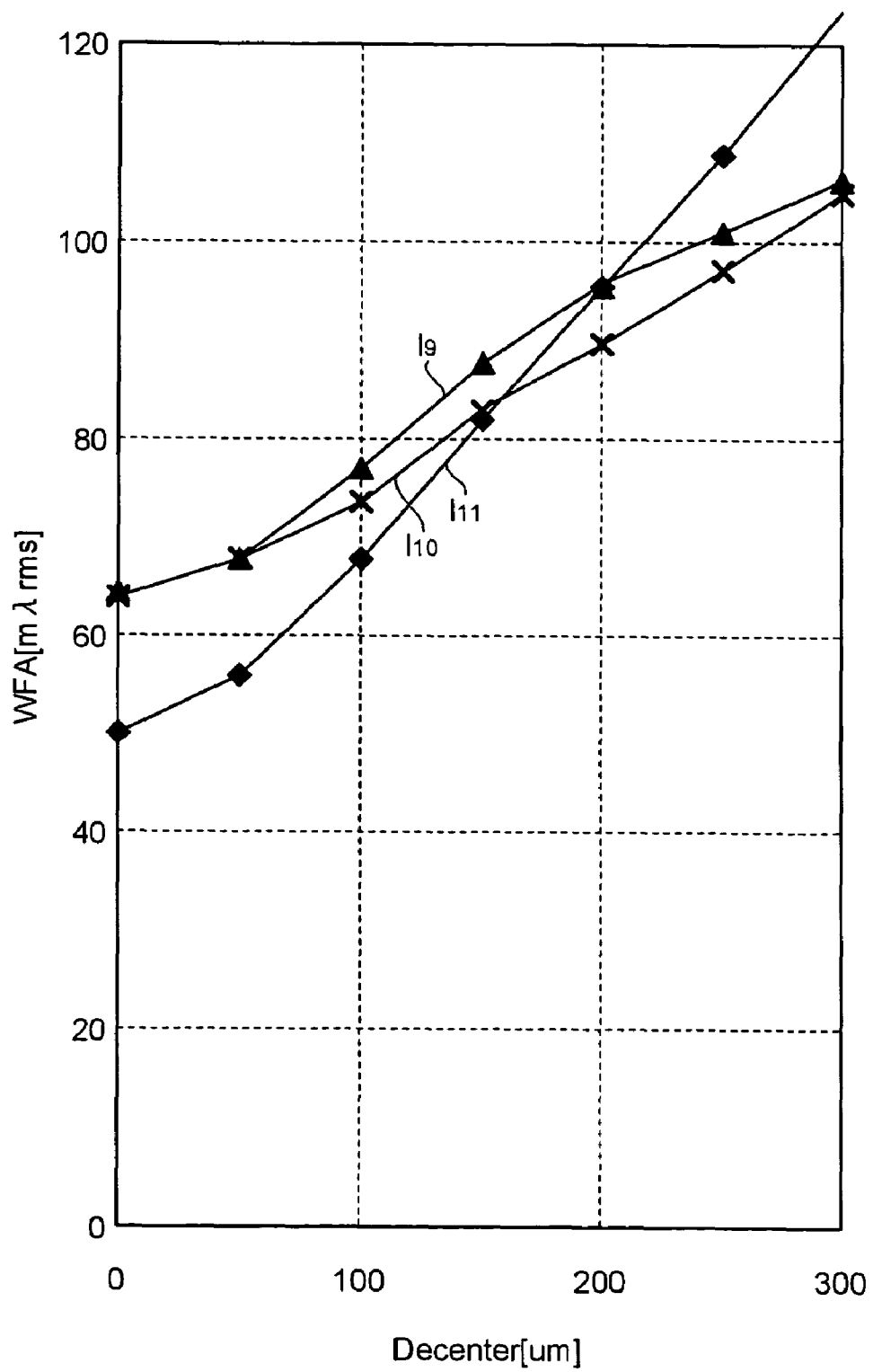
FIG. 8 is a graph of a change in the variance of the wavefront aberration relative to a displacement in the positional relationship between an objective lens and the liquid crystal panel in using a DVD according to the first variant.

FIG. 8 is a graph of the positional displacement between the objective lens 11 and the liquid crystal panel 9 in using a DVD, and a variance of the wavefront aberration according to the first embodiment and the first variant. As shown in FIG. 8, the horizontal axis indicates a displaced distance, and the vertical axis indicates a variance of the wavefront aberration. The curve I9 indicates the optical recording medium reproducing device according to the first embodiment, and the curve I10 indicates the optical recording medium reproducing device according to the first variant. The curve I11 indicates an optical recording medium reproducing device including a liquid crystal panel optimized for a DVD.

As shown in FIG. 8, the optical recording medium reproducing device according to the first variant has characteristics that an increasing rate of the variance of the wavefront aberration is low relative to the positional displacement.

Figure 9:
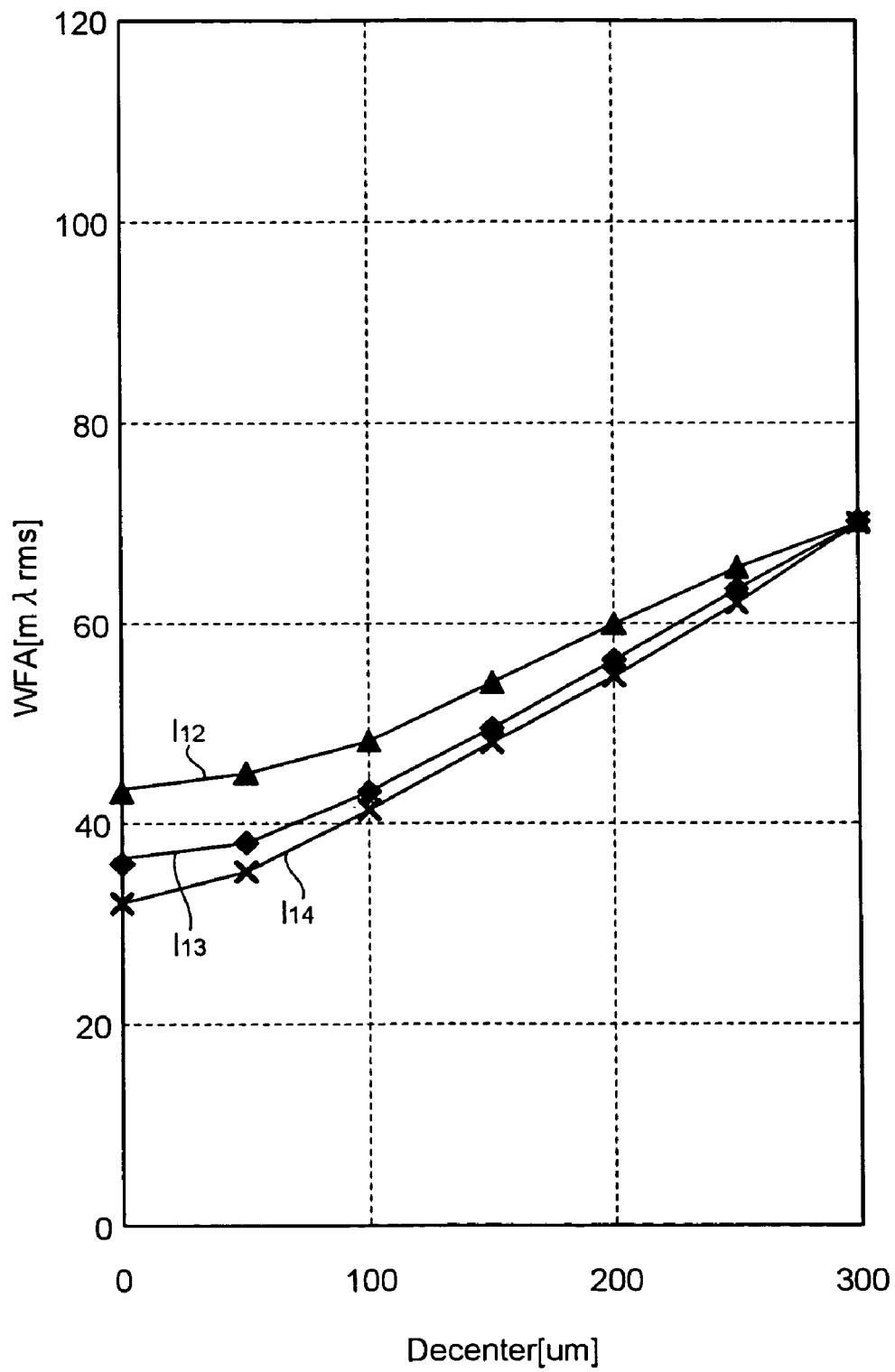
FIG. 9 is a graph of a change in the variance of the wavefront aberration relative to a displacement in the positional relationship between the objective lens and the liquid crystal panel in using a BD according to the first variant.

Next, an influence of the positional displacement in using a BD will be explained. FIG. 9 is a graph of a relationship between the positional displacement between the objective lens 11 and the liquid crystal panel 9 in using a BD, and the variance of the wavefront aberration according to the first embodiment and the first variant. As shown in FIG. 9, the vertical axis and the horizontal axis are similar to those in FIG. 8, the curve I12 indicates the optical recording medium reproducing device according to the first embodiment, the curve I13 indicates an optical recording medium reproducing device including a liquid crystal panel optimized for a BD, and the curve I14 indicates an optical recording medium reproducing device according to the first variant.

As shown in FIG. 9, in using a BD, the first embodiment and the first variant both have substantially identical performance to that in the optical recording medium reproducing device optimized for a BD. Particularly in the optical recording medium reproducing device according to the first embodiment, it is indicated that an increasing rate of the variance relative to the change in the positional displacement value is also low in using a BD.

Next, a second variant of the first embodiment will be explained. In the first embodiment, the electrode pattern of the transparent electrode 28 to be used for correcting the optical system wavefront aberration has the structure shown in FIG. 3B, which is designed by assuming that a comatic aberration occurs in the rotation direction as the optical system wavefront aberration. The optical system wavefront aberration which actually occurs includes a spherical aberration, astigmatism, and the like in addition to the comatic aberration, and the comatic aberration, the spherical aberration, the astigmatism, and the like may coexist depending on the design of the optical system.

Figure 10A:
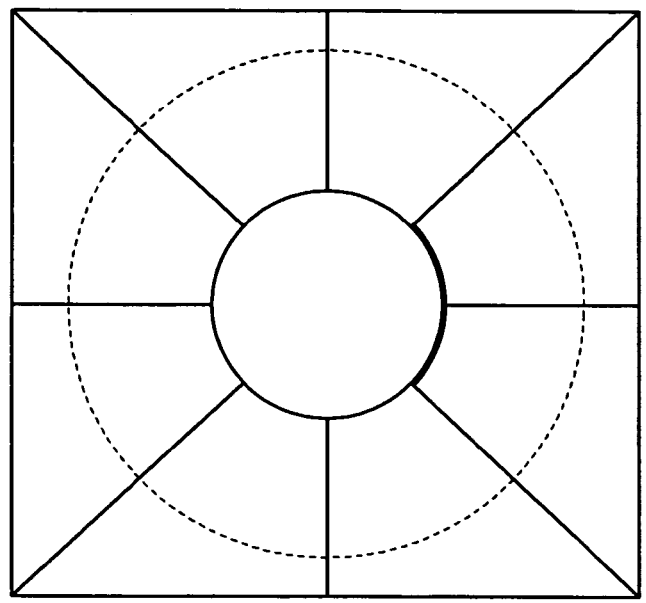
FIG. 10A is a schematic diagram of an electrode pattern of a transparent electrode used for correcting the optical system wavefront aberration according to a second variant of the first embodiment.

In the second variant, the electrode pattern that is usable for correcting the astigmatism is used on the assumption of the astigmatism as the possible optical system wavefront aberration. FIG. 10A depicts the electrode pattern of the transparent electrode used for correcting the optical system wavefront aberration, and the transparent electrode having the pattern is replaced with the transparent electrode shown in FIG. 3B so that the optical recording medium reproducing device according to the second variant is constituted.

Figure 10B:
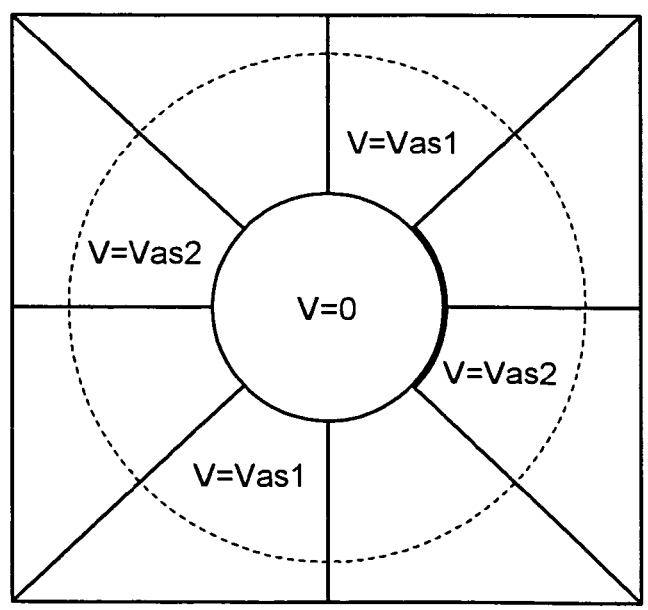
FIG. 10B is a schematic diagram of a voltage applied to each pattern when correcting the optical system wavefront aberration according to the second variant.

In the second variant, when astigmatism occurs in using a DVD, an electrode having the pattern shown in FIG. 10B is applied to the transparent electrode for the correction of the optical system wavefront aberration. The optical system wavefront aberration as the astigmatism can be corrected by the applied voltage.

Next, a third variant of the first embodiment will be explained. An optical recording medium reproducing device according to the third variant employs a transparent electrode having an electrode pattern capable of, when both astigmatism and a comatic aberration may occur as the optical system wavefront aberration, correcting the respective aberrations.

Figure 11A:
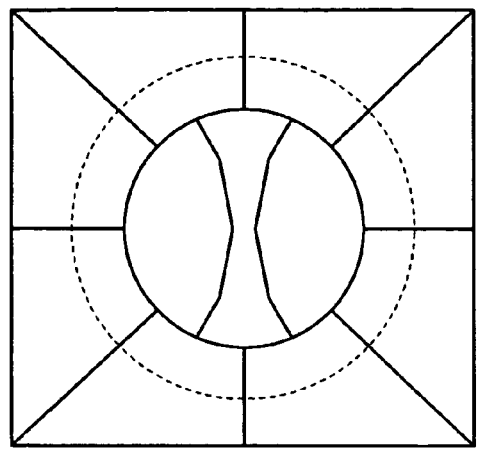
FIG. 11A is a schematic diagram of an electrode pattern of a transparent electrode used for correcting the optical system wavefront aberration according to a third variant of the first embodiment.

FIG. 11A is a schematic diagram of the electrode pattern of the transparent electrode used for correcting the optical system wavefront aberration according to the third variant. As shown in FIG. 11A, the transparent electrode in the second variant corresponds to both the astigmatism and the comatic aberration, that is, it has the electrode pattern where the pattern shown in FIG. 3B and the pattern shown in FIG. 10A are combined.

Figure 11B:
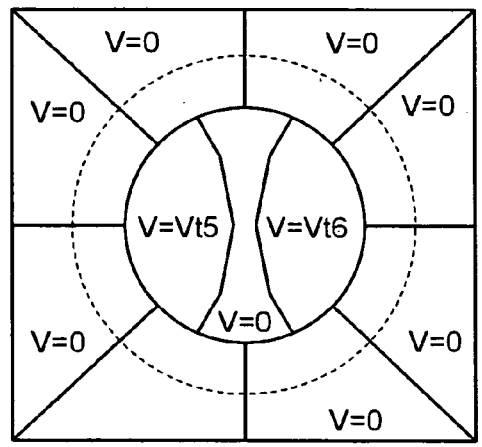
FIG. 11B is a schematic diagram of a voltage applied to each pattern when a comatic aberration occurs as the optical system wavefront aberration according to the third variant.

FIG. 11B is a schematic diagram of an applied voltage for each pattern when a comatic aberration occurs according to the third variant. As shown in FIG. 11B, when a comatic aberration occurs, the applied voltage is similar to that in FIG. 3B.

Figure 11C:
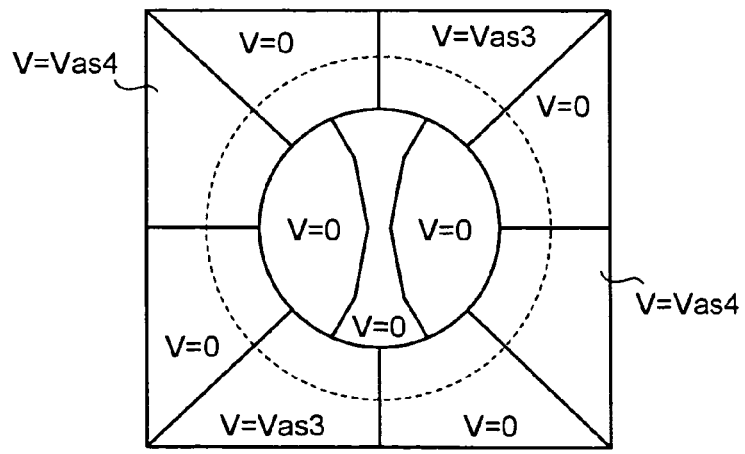
FIG. 11C is a schematic diagram of a voltage applied to each pattern when astigmatism occurs as the optical system wavefront aberration according to the third variant.

FIG. 11C is a schematic diagram of an applied voltage for each pattern when astigmatism occurs according to the third variant. As shown in FIG. 11C, when astigmatism occurs, the applied voltage is similar to that in FIG. 10B.

Next, a fourth variant of the first embodiment will be explained. An optical recording medium reproducing device according to the fourth variant employs a transparent electrode having a pattern capable of, when both a spherical aberration and a comatic aberration may occur as the optical system wavefront aberration, correcting the respective aberrations.

Figure 12A:
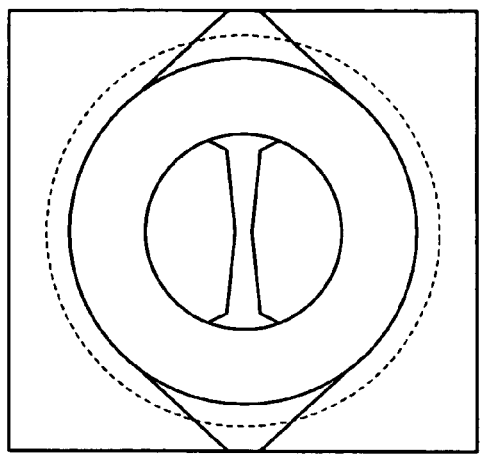
FIG. 12A is a schematic diagram of an electrode pattern of a transparent electrode used for correcting the optical system wavefront aberration according to a fourth variant of the first embodiment.
Figure 12B:
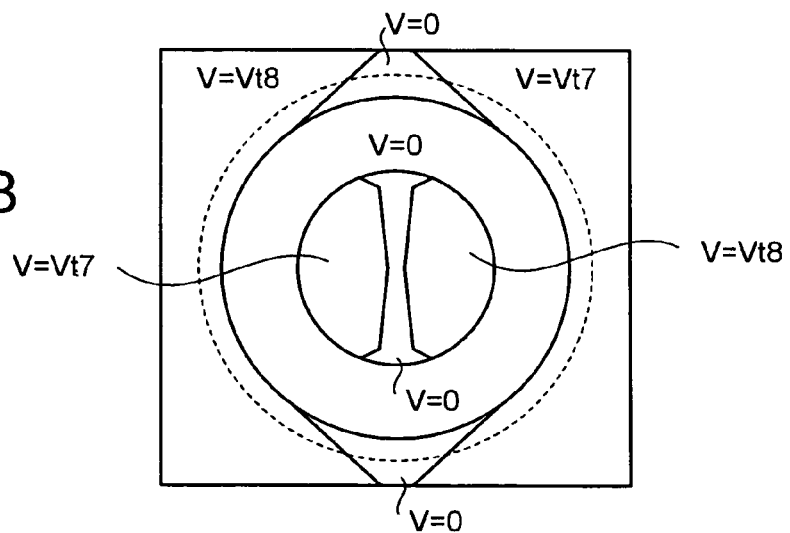
FIG. 12B is a schematic diagram of a voltage applied to each pattern when a comatic aberration occurs as the optical system wavefront aberration according to the fourth variant.
Figure 12C:
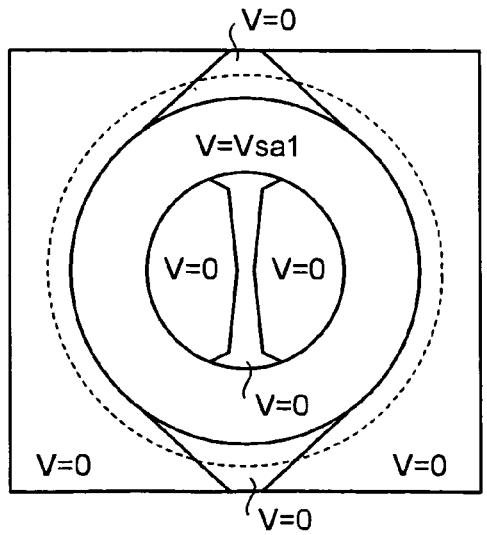
FIG. 12C is a schematic diagram of a voltage applied to each pattern when a spherical aberration occurs as the optical system wavefront aberration according to the fourth variant.

FIG. 12A is a diagram of the electrode pattern of the transparent electrode used for correcting the optical system wavefront aberration according to the fourth variant. FIG. 12B is a schematic diagram of an applied voltage for each pattern when a comatic aberration occurs according to the fourth variant. FIG. 12C is a schematic diagram of an applied voltage for each pattern when a spherical aberration occurs according to the fourth variant.

As shown in FIGS. 12A to 12C, the optical recording medium reproducing device according to the fourth variant can correct the optical system wavefront aberration even when both a spherical aberration and a comatic aberration may occur as the optical system wavefront aberration.

Next, a fifth variant of the first embodiment will be explained. An optical recording medium reproducing device according to the fifth variant employs a transparent electrode having an electrode pattern capable of, when astigmatism, a comatic aberration, and a spherical aberration may occur, correcting the respective aberrations.

Figure 13A:
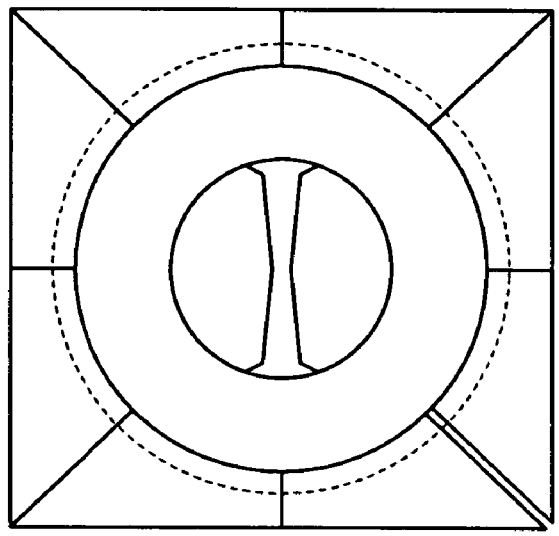
FIG. 13A is a schematic diagram of an electrode pattern of a transparent electrode used for correcting the optical system wavefront aberration according to a fifth variant of the first embodiment.
Figure 13B:
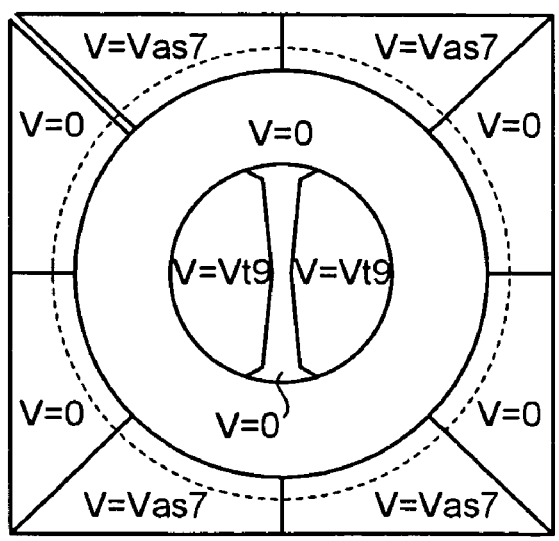
FIG. 13B is a schematic diagram of a voltage applied to each pattern when a comatic aberration occurs as the optical system wavefront aberration according to the fifth variant.
Figure 13C:
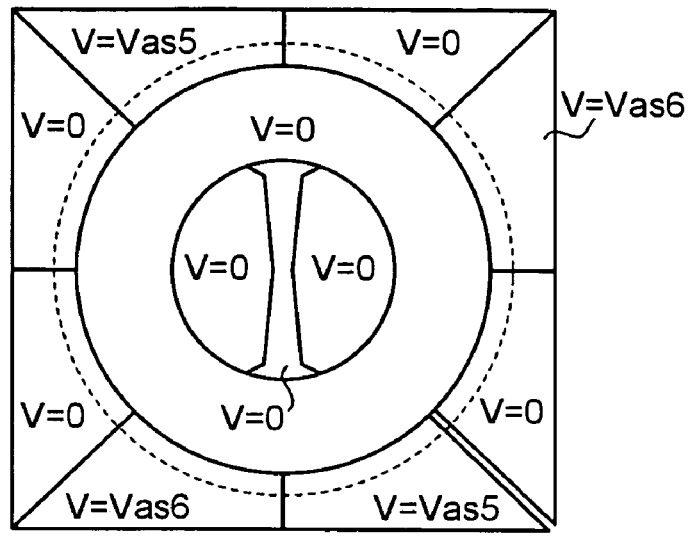
FIG. 13C is a schematic diagram of a voltage applied to each pattern when astigmatism occurs as the optical system wavefront aberration according to the fifth variant.
Figure 13D:
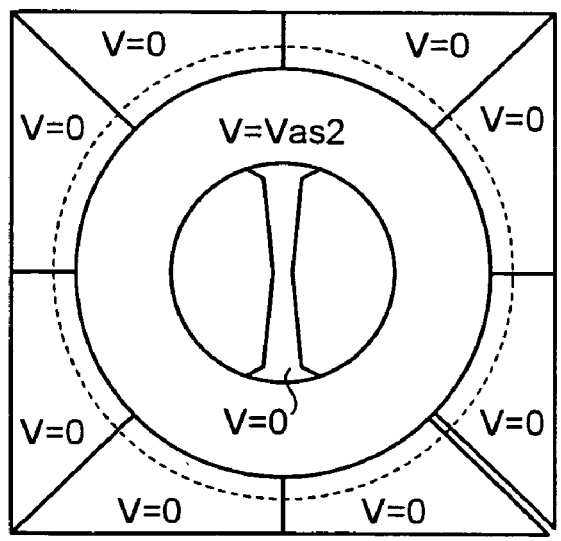
FIG. 13D is a schematic diagram of a voltage applied to each pattern when a spherical aberration occurs as the optical system wavefront aberration according to the fifth variant.

FIG. 13A is a diagram of the electrode pattern of the transparent electrode used for correcting the optical system wavefront aberration according to the fifth variant, and FIG. 13B is a schematic diagram of an applied voltage for each pattern when a comatic aberration occurs according to the fifth variant. FIG. 13C is a schematic diagram of an applied voltage for each pattern when astigmatism occurs according to the fifth variant, and FIG. 13D is a schematic diagram of an applied voltage for each pattern when a spherical aberration occurs according to the fifth variant. As a result, the aberration correction can be performed when astigmatism, a comatic aberration, and a spherical aberration occur as the optical system wavefront aberration.

Hereinabove the electrode pattern of the transparent electrode and the like for different kinds of optical system wavefront aberrations is explained in the second to the fifth variants. As explained in the variants, the present invention can be adapted for various wavefront aberrations that occur as the optical system wavefront aberration. Therefore, it is not necessary to interpret that the present invention is limited to the comatic aberration in the rotation direction as the optical system wavefront aberration.

Next, an optical recording medium reproducing device according to a second embodiment will be explained. The optical recording medium reproducing device according to the second embodiment is different from that according to the first embodiment in that it includes a plurality of objective lenses and the objective lenses are appropriately changed in response to the change in the kind of the optical recording medium 14 to read recorded information.

Figure 14:
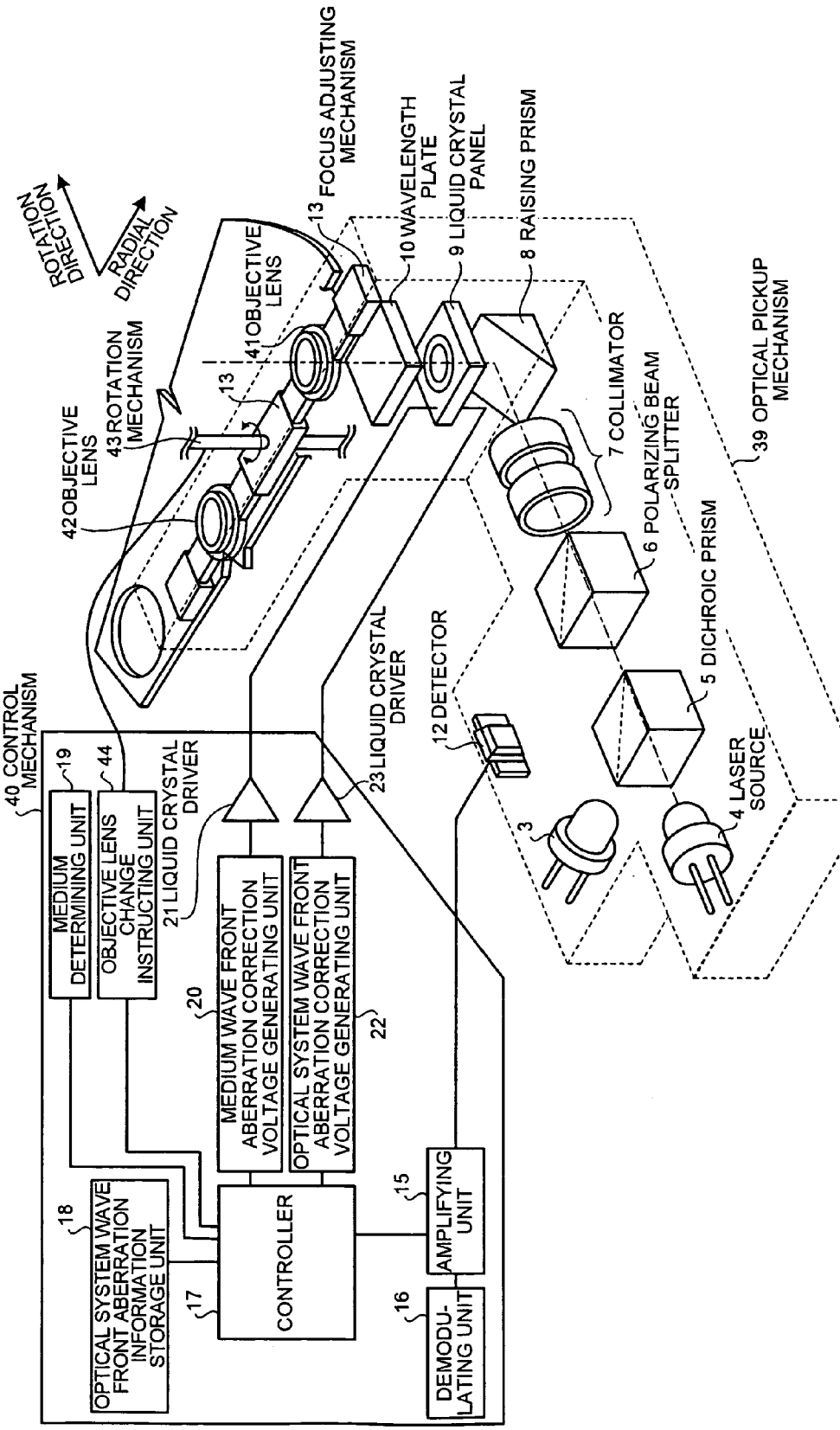
FIG. 14 is a schematic diagram of an optical recording medium reproducing device according to a second embodiment of the present invention.

FIG. 14 is a schematic diagram of the optical recording medium reproducing device according to the second embodiment. The parts that are the same or similar to those in the first embodiment are denoted with like names and like signs, and have the same structure and functions as those in the first embodiment unless otherwise stated hereinafter.

The optical recording medium reproducing device according to the second embodiment is constituted to include a plurality of objective lenses 41 and 42 in an optical pickup mechanism 39, and the objective lenses 41 and 42 are constituted to be spaced, respectively, by an equal distance from a rotation mechanism 43 functioning as an objective lens changing unit, and to be changed by the rotation of the rotation mechanism 43. In other words, in the second embodiment, the objective lenses 41 and 42 corresponding to two kinds of optical recording mediums 14 such as a DVD and a BD can be appropriately changed according to the kind of the optical recording medium 14 to be used.

The control mechanism 40 includes an objective lens change instructing unit 44 in response to the objective lenses in the optical pickup mechanism 39. The objective lens change instructing unit 44 changes the objective lenses 41 and 42 by rotating the rotation mechanism 43 in response to the kind of the optical recording medium 14. Specifically, the objective lens change instructing unit 44 is designed to control the rotation mechanism 43 based on the information acquired in the medium determining unit 19.

Since the optical recording medium reproducing device according to the second embodiment is designed to appropriately change the objective lenses 41 and 42 in response to the kind of the optical recording medium 14, there is a concern that the objective lenses 41 and 42 are inclined to be positioned relative to the optical axis of the laser beam due to the accuracy of the rotation mechanism 43, which performs the changing operation. Thus, in the second embodiment, optimization is performed so as not to generate an optical system wavefront aberration when the objective lens 42 corresponding to a BD is selected, while the correction of the optical system wavefront aberration is performed in the liquid crystal panel 9 on the assumption that the optical system wavefront aberration occurs when the objective lens 41 corresponding to a DVD is selected.

In other words, in the second embodiment, when the objective lens 41 is selected, that is, a DVD is used as the optical recording medium 14, and a laser beam is output from the laser source 4, the optical system wavefront aberration occurs not only due to the position of the laser source 4 but also due to the inclination of the objective lens 41. Thus, the optical recording medium reproducing device according to the second embodiment is designed so that an appropriate voltage is applied to the transparent electrode 28 provided in the liquid crystal panel 9 to correct the optical system wavefront aberration that occurs in the entire optical system in the optical pickup mechanism 39 including the objective lens 41.

Even when a new aberration occurs in using the objective lens 41 due to the several objective lenses, the correction of the optical system wavefront aberration can be performed similarly as in the first embodiment. For example, when the occurrence of the aberration due to the inclination of the objective lens 41 or the like can be predicted in advance during designing, the electrode pattern of the transparent electrode 28 provided in the liquid crystal panel 9 and the value of the voltage applied to the electrode pattern are determined in advance to eliminate the aberration that occurs in the light flux of the laser beam, which occurs in using a DVD as the optical recording medium 14. Further, the information such as the voltage value on the optical system wavefront aberration is stored in the optical system wavefront aberration information storage unit 18, thereby performing the aberration correction. Even when the inclination of the objective lens 41 or the like occurs after manufacture, for example, the value of the voltage applied to the electrode pattern of the transparent electrode 28 is adjusted before being shipped as products, and the information such as optimal voltage value is stored in the optical system wavefront aberration information storage unit 18, thereby performing the correction of the optical system wavefront aberration.

According to the second embodiment, the correction of the medium wavefront aberration can be performed similarly as in the first embodiment irrespective of the difference in the structure of the optical system. In other words, the medium wavefront aberration is caused by a different factor than the inclination of the objective lens 41 or the like. Therefore, the mechanism the corrects the medium wavefront aberration, that is, the electrode pattern of the transparent electrode 29 or the like, can be designed similarly as in the first embodiment.

A variant of the second embodiment will be explained. An optical recording medium reproducing device according to the variant is constituted to adjust a focal distance between the objective lenses 41 and 42 to an appropriate distance so that a light flux is used for the spot forming even when a different optical recording medium 14 is used.

Figure 15A:
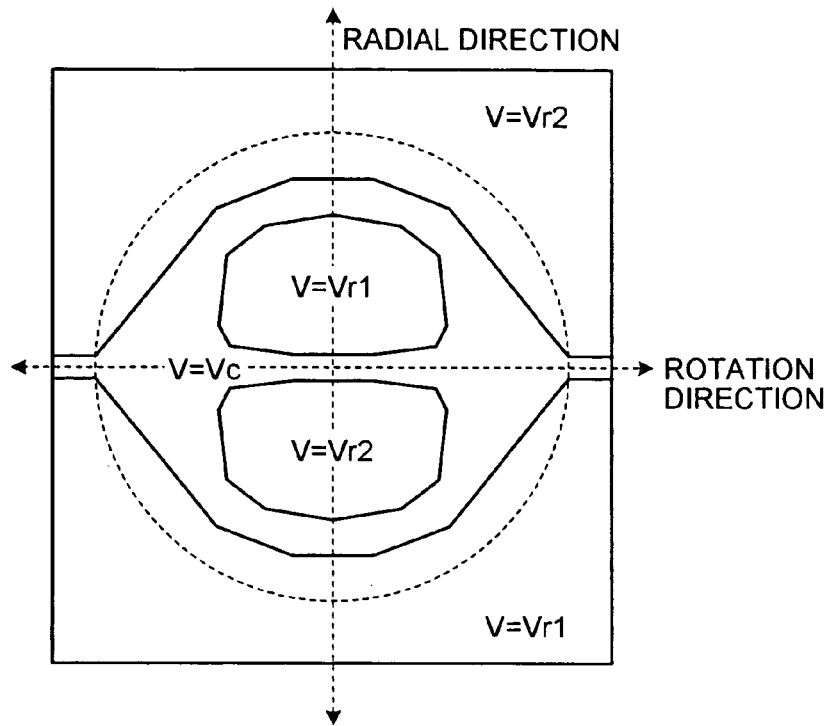
FIG. 15A is a schematic diagram of an electrode pattern of a transparent electrode used for correcting the medium wavefront aberration according to a variant of the second embodiment.
Figure 15B:
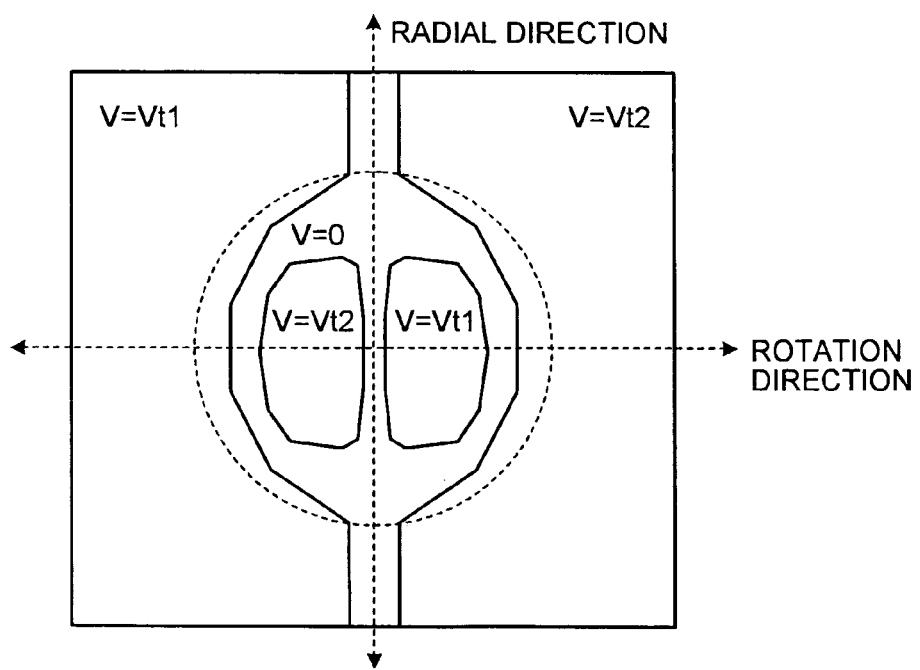
FIG. 15B is a schematic diagram of an electrode pattern of a transparent electrode used for correcting the optical system wavefront aberration according to the variant of the second embodiment.

FIG. 15A is a diagram of the electrode pattern of the transparent electrode used for correcting the medium wavefront aberration, and FIG. 15B is a diagram of the electrode pattern of the transparent electrode used for correcting the optical system wavefront aberration. As shown in FIGS. 15A and 15B, the region surrounded by a dashed like indicates the region where the light flux used for the spot forming passes in using both a BD and a DVD.

The same objective lens is used in the different optical recording mediums 14 in the first embodiment. Thus, the light flux used for the spot forming among the laser beams passing through the liquid crystal panel 9 is different in using the optical recording medium 14 due to the difference in NA values in the respective optical recording mediums 14. On the contrary, in this variant, the focal distance between the objective lens 41 and the objective lens 42 is adjusted to correspond to the difference in the NA values so that, even when different optical recording mediums 14 are used, the light flux passing through the same region among the laser beams passing through the liquid crystal panel 9 is used for the spot forming.

Using the structure of the optical recording medium reproducing device according to this variant can be beneficial. As explained above, in this variant, the light flux passing through the same region among the laser beams passing through the liquid crystal panel 9 is used for the spot forming both in using a BD and in using a DVD. Therefore, the electrode pattern of the transparent electrode used for correcting the wavefront aberration has only to employ the structure of correcting the wavefront aberration for the light flux passing through the same region, thereby simplifying the electrode pattern. The electrode pattern can be optimized for the correction of the wavefront aberration for the light flux passing through the single region, thereby demonstrating the aberration correcting function with more accuracy. As a result, the electrode pattern of the transparent electrode used for correcting the medium wavefront aberration can correct the aberration with more accuracy using the simple electrode pattern.

The first and the second embodiments according to the present invention and their variants are explained hereinabove, but the present invention is not limited to the above, and those skilled in the art can apply the present invention to various embodiments, variants, and applications. For example, the first and the second embodiments and their variants have the structure where the optical system is optimized for a BD, but the structure may be optimized for a DVD, and the transparent electrode 28 may be used for correcting the optical system wavefront aberration that occurs in using a BD. The kinds of the optical recording medium 14 to be used is not limited to two kinds, and the optical recording medium reproducing device having an arbitrary natural number of kinds of mediums can be formed.

As shown in FIGS. 1 and 14, the entire structure of the optical recording medium reproducing device is designed to include the optical pickup mechanism including the specific optical system and the control mechanism, which can be constituted of, for example, an electronic circuit, but the separation is directed for easily understanding the invention, and the control mechanism may be incorporated in the optical pickup mechanism, for example.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical pickup device comprising:
   a light source that outputs a light;
   an optical system through which the light is passed to thereby form a light spot on a surface of an optical recording medium;
   an optical system aberration correcting unit that corrects an optical system wavefront aberration that occurs while the light passes through the optical system so that the light that illuminates the surface is less in the optical system wavefront aberration;
   a medium aberration correcting unit that corrects a medium wavefront aberration that occurs due to an angle between the light that illuminates the surface and the surface so that the light that illuminates the surface is less in the medium wavefront aberration; and
   a light receiving unit that receives a light that is reflected from the surface;

wherein the light source includes a first light source that outputs an irradiating light on a first optical recording medium and a second light source that outputs an irradiating light on a second optical recording medium different from the first optical recording medium, and wherein the optical system is formed to restrict within a permissible range an aberration that occurs in the light flux forming the light spot among the irradiating lights output from the first light source, and the optical system aberration correcting unit corrects only an optical system wave front aberration that occurs when the irradiating light output from the second light source passes through the optical system.

2. The optical pickup device according to claim 1, wherein the optical system aberration correcting unit and the medium aberration correcting unit reduce an aberration that occurs in a light flux used for spot forming among the irradiating lights output from the first and second light sources.

3. The optical pickup device according to claim 1,
wherein the optical system aberration correcting unit and the medium aberration correcting unit are integrally formed in a liquid crystal panel, and the liquid crystal panel includes:
a first electrode that has an electrode pattern for correcting an optical system wavefront aberration;
a second electrode that has an electrode pattern for correcting a medium wavefront aberration; and
a liquid crystal material layer that is positioned between the first electrode and the second electrode and whose index of refraction changes according to a value of a voltage applied by the first electrode and the second electrode.

4. The optical pickup device according to claim 1, wherein the medium aberration correcting unit corrects a medium wavefront aberration based on information acquired from a return light received in the light receiving unit.

5. The optical pickup device according to claim 4, wherein the optical system includes:
a first objective lens that is used for spot forming on a first optical recording medium;
a second objective lens that is used for spot forming on a second optical recording medium; and
an objective lens changing unit that changes the first objective lens and the second objective lens according to an optical recording medium to be used.

6. An optical pickup device comprising:
a light source that outputs a light; an optical system through which the light is passed to thereby form a light spot on a surface of an optical recording medium;
an optical system aberration correcting unit that corrects an optical system wavefront aberration that occurs while the light passes through the optical system so that the light that illuminates the surface is less in the optical system wavefront aberration;
a medium aberration correcting unit that corrects a medium wavefront aberration that occurs due to an angle between the light that illuminates the surface and the surface so that the light that illuminates the surface is less in the medium wavefront aberration; and
a light receiving unit that receives a light that is reflected from the surface;
wherein the optical system aberration correcting unit and the medium aberration correcting unit are integrally formed in a liquid crystal panel, and the liquid crystal panel includes:
a first electrode that has an electrode pattern for correcting an optical system wavefront aberration;
a second electrode that has an electrode pattern for correcting a medium wavefront aberration; and
a liquid crystal material layer that is positioned between the first electrode and the second electrode and whose index of refraction changes according to a value of a voltage applied by the first electrode and the second electrode, wherein the light source includes a first light source that outputs an irradiating light on a first optical recording medium and a second light source that outputs an irradiating light on a second optical recording medium different from the first optical recording medium, wherein the optical system is formed to restrict within a permissible range an aberration that occurs in the light flux forming a spot among irradiating lights output from the first light source, wherein the first electrode includes an electrode pattern that can give a phase difference that restricts within a permissible range an aberration occurring in the light flux forming the spot among irradiating lights output from the second light source, and wherein the second electrode includes an electrode pattern that can give a phase difference that restricts within a permissible range an aberration occurring in the light flux forming the spot among irradiating lights output from the first light source and the second light source.

7. The optical pickup device according to claim 6, wherein the first electrode includes an electrode pattern that can give a phase difference that restricts within a permissible range a comatic aberration occurring in the rotation direction of the first optical recording medium and the second optical recording medium in the light flux forming the spot.

8. The optical pickup device according to claim 6, wherein the first electrode includes an electrode pattern that can give a phase difference that within a permissible range restricts astigmatism occurring in the light flux forming the spot.

9. The optical pickup device according to claim 6, wherein the first electrode includes an electrode pattern that can give a phase difference that restricts within a permissible range both astigmatism and a comatic aberration occurring in the light flux forming the spot.

10. The optical pickup device according to claim 6, wherein the first electrode includes an electrode pattern that can give a phase difference that restricts within a permissible range both a spherical aberration and a comatic aberration occurring in the light flux forming the spot.

11. The optical pickup device according to claim 5, wherein the first electrode includes an electrode pattern that can give a phase difference that restricts within a permissible range astigmatism, a comatic aberration, and a spherical aberration occurring in the light flux forming a spot.

12. The optical pickup device according to claim 5, wherein the second electrode includes an electrode pattern that can give a phase difference that restricts within a permissible range a comatic aberration occurring in the direction orthogonal to the rotation direction of the first optical recording medium and the second optical recording medium in the light flux forming the spot.

13. An optical recording medium reproducing device that performs light irradiating on an irradiated surface of an optical recording medium and reproduces information recorded in the optical recording medium based on a return light of the irradiated light, comprising:
a plurality of light sources that output an irradiating light;
an optical system that forms a spot on the irradiated surface based on the irradiating light output from the light sources;

an optical system aberration correcting unit that corrects an optical system wavefront aberration that occurs while the irradiating light passes through the optical system;

a medium aberration correcting unit that corrects a medium wavefront aberration that occurs based on an angle between the irradiated surface and the irradiating light in the irradiated surface;

a light receiving unit that receives a return light whose wavefront aberration is corrected by the optical system aberration correcting unit and the medium aberration correcting unit; and a demodulating unit that demodulates information recorded in the optical recording medium based on a return light received in the light receiving unit, wherein the light sources include a first light source that outputs an irradiating light on a first optical recording medium and a second light source that outputs an irradiating light on a second optical recording medium different from the first optical recording medium, wherein the optical system is formed to restrict within a permissible range an aberration that occurs in the light flux forming the spot among the irradiating light output from the first light source, and wherein the optical system aberration correcting unit corrects only an optical system wave front aberration that occurs when the irradiating light output from the second light source passes through the optical system.

14. The optical recording medium reproducing device according to claim 13, wherein the optical system aberration correcting unit and the medium aberration correcting unit are integrally formed in a liquid crystal panel, and the liquid crystal panel includes:

a first electrode that has an electrode pattern of correcting an optical system wavefront aberration;

a second electrode that has an electrode pattern of correcting a medium wavefront aberration; and a liquid crystal material layer that is positioned between the first electrode and the second electrode and whose index of refraction changes according to a value of a voltage applied by the first electrode and the second electrode.

15. The optical recording medium reproducing device according to claim 13, further comprising a storage unit that stores information on an optical system wavefront aberration that occurs when an irradiating light is output from the second light source, wherein the optical system aberration correcting unit corrects an optical system wavefront aberration based on information stored in the storage unit.

\* \* \* \* \*